US012400290B2

(12) United States Patent
Ratcliff

(10) Patent No.: US 12,400,290 B2
(45) Date of Patent: Aug. 26, 2025

(54) METHOD AND SYSTEM OF EFFICIENT IMAGE RENDERING FOR NEAR-EYE LIGHT FIELD DISPLAYS

(71) Applicant: Intel Corporation, Santa Clara, CA (US)

(72) Inventor: Joshua Ratcliff, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/550,952

(22) Filed: Dec. 14, 2021

(65) Prior Publication Data
US 2022/0108420 A1    Apr. 7, 2022

(51) Int. Cl.
*G06T 3/4038*        (2024.01)
*G02B 27/01*         (2006.01)

(52) U.S. Cl.
CPC ........ *G06T 3/4038* (2013.01); *G02B 27/0172* (2013.01); *G02B 2027/0178* (2013.01)

(58) Field of Classification Search
CPC ............. G06T 3/4038; G02B 27/0172; G02B 2027/0178
See application file for complete search history.

(56) References Cited

U.S. PATENT DOCUMENTS

| | | | | |
|---|---|---|---|---|
| 9,519,144 B2 * | 12/2016 | Lanman | ............... | G09G 3/00 |
| 10,070,115 B2 * | 9/2018 | Graziosi | ............. | H04N 13/351 |
| 10,244,223 B2 * | 3/2019 | Graziosi | .............. | H04N 13/111 |
| 10,664,953 B1 * | 5/2020 | Lanman | ................... | G06N 3/08 |
| 10,827,165 B2 | 11/2020 | Ratcliff et al. | | |
| 10,948,740 B2 * | 3/2021 | Ratcliff | ................ | G02B 3/0043 |
| 11,150,605 B1 * | 10/2021 | Xiao | .................... | G06N 3/084 |
| 11,948,320 B2 * | 4/2024 | Sinha | ...................... | G06T 7/596 |
| 2014/0340389 A1 * | 11/2014 | Lanman | .............. | G02B 27/017 345/589 |
| 2018/0091800 A1 * | 3/2018 | Ratcliff | ................ | H04N 13/305 |
| 2018/0343434 A1 * | 11/2018 | Perreault | ............ | G02B 27/0172 |
| 2019/0035113 A1 * | 1/2019 | Salvi | ...................... | G06N 3/084 |
| 2019/0045176 A1 * | 2/2019 | Ratcliff | ................. | G02B 30/36 |
| 2019/0086679 A1 | 3/2019 | Ratcliff et al. | | |
| 2019/0094545 A1 * | 3/2019 | Lo | ........................ | G03B 21/142 |
| 2020/0304776 A1 * | 9/2020 | Ratcliff | ............... | H04N 13/366 |
| 2022/0317465 A1 * | 10/2022 | Yang | .................... | H04N 13/307 |

OTHER PUBLICATIONS

Ahn, Song Ho, "OpenGL Projection Matrix", www.songho.ca/opengl/gl_projectionmatrix.html; 2019.
Chai, Jin-Xiang, et al., "Plenoptic Sampling", SIGGRAPH 2000, New Orleans, LA USA, 2000.
Lanman, D., et al., "Near-eye light field displays", SIGGRAPH'13 (2013).
Nvidia, "LightField Forum", Light Field and Computational Imaging News; lightfield-forum.com/light-field-camera-prototypes/nvidia-near-eye-light-field display; 2022.

(Continued)

*Primary Examiner* — Ibrahim A Khan
(74) *Attorney, Agent, or Firm* — Hanley, Flight & Zimmerman, LLC

(57) ABSTRACT

A system, article, and method of highly efficient image rendering for near-eye light field displays uses sparse root elemental image rendering.

23 Claims, 17 Drawing Sheets

(56) References Cited

OTHER PUBLICATIONS

Santell, J., "Model View Projection", https://jsantell.com/model-view-projection; 2019.
Wang, X., et al., "Apparent resolution enhancement for near-eye light field display", SIGGRAPH Asia 2015 Mobile Graphics and Interactive Applications (2015).
Wikipedia, "Cardinal point (optics)", https://en.wikipedia.org/wiki/Cardinal_point_(optics); 2022.
Xiao, L., et al., "DeepFocus: learned image synthesis for computational displays", ACM Trans. Graph. 37, 6, Article 200 (Nov. 2018).
Zhang, C., et al., "Light Field Sampling", MS Research and CMU.

* cited by examiner

FIG. 5

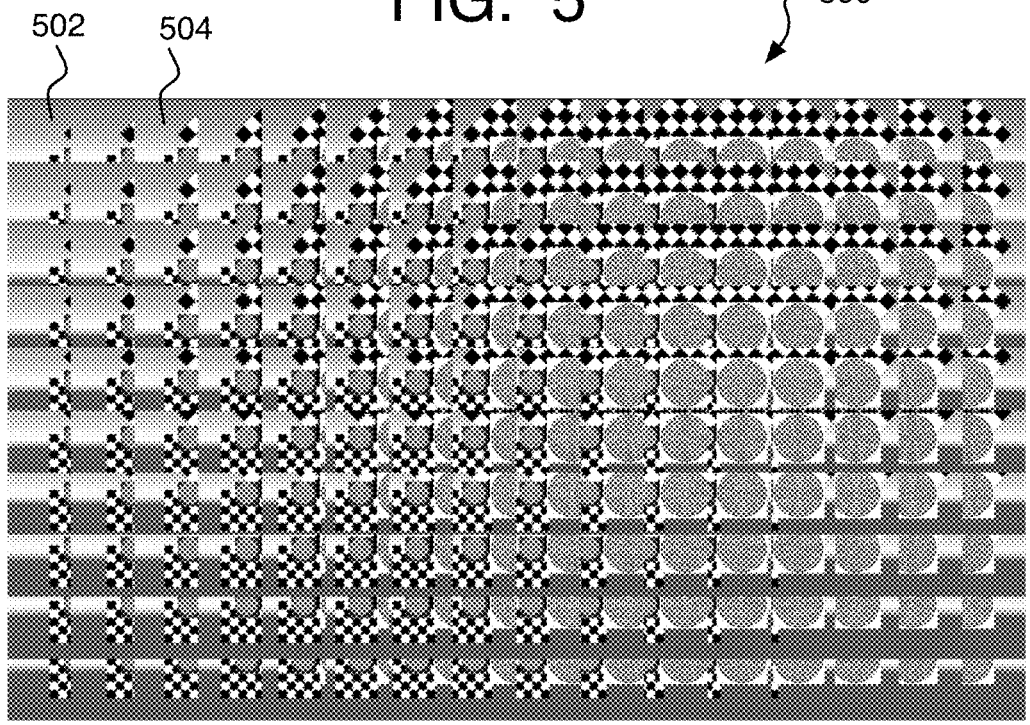

GENERATE ROOT ELEMENTAL IMAGES BEING LESS THAN ALL ELEMENTAL IMAGES ON AN INTEGRAL IMAGE HAVING CONTENT OF A SCENE 702

WHEREIN EACH ELEMENTAL IMAGE IS OF A DIFFERENT LIGHT PROJECTING ELEMENT ON AN ARRAY OF THE ELEMENTS FORMING A NEAR-EYE DISPLAY 704

USE THE ROOT ELEMENTAL IMAGES TO GENERATE OTHER ELEMENTAL IMAGES OF THE INTEGRAL IMAGE 706

PROVIDE THE ROOT AND OTHER ELEMENTAL IMAGES TO TO DISPLAY THE INTEGRAL IMAGE ON THE NEAR-EYE DISPLAY 708

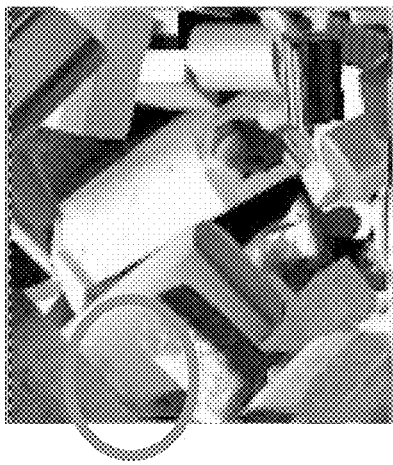
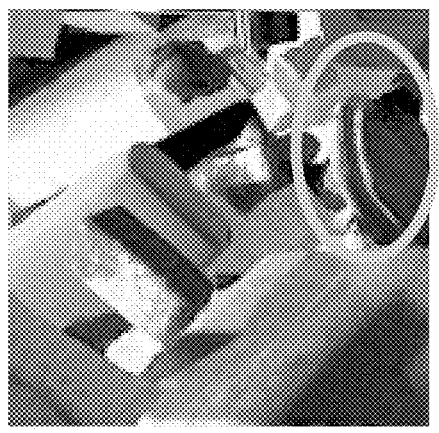
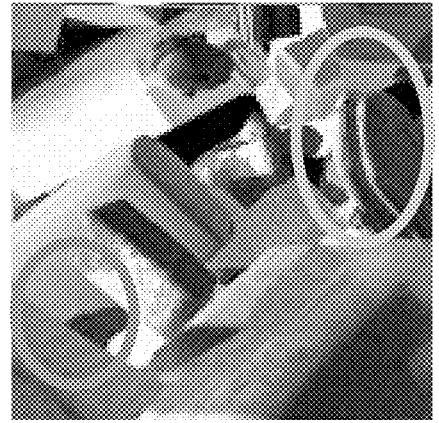
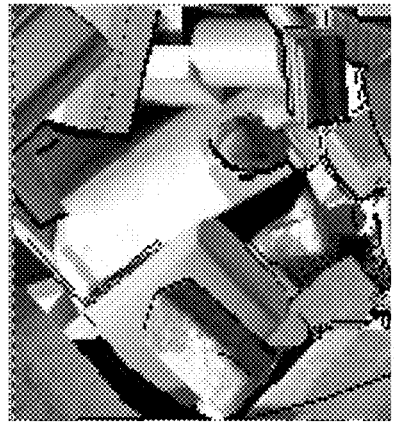
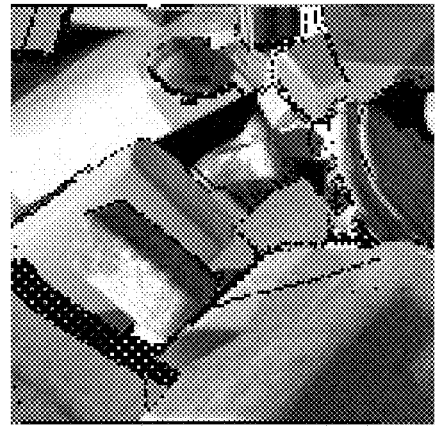

FIG. 17A  1700         FIG. 17B  1702
 

METHOD AND SYSTEM OF EFFICIENT IMAGE RENDERING FOR NEAR-EYE LIGHT FIELD DISPLAYS

BACKGROUND

Near-eye light field displays are found on head mounted displays (HMDs) and other light projecting devices. HMDs are worn over the eyes and present images to a user wearing the HMD usually to provide the user a point of view (POV) in a virtual reality (VR) or augmented reality (AR) world. The display in the HMD is often positioned very close to the eyes such as within 1-3 inches (2.5-7.5 cm) from the eye. Rendering images this close to the eyes when using binocular HMDs with one separate screen for each eye can present specific problems because such near-eye display screens require very high resolutions. This results in large, inefficient, computational loads required to present the images on the near-eye displays.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is an illustration of an example full integral image for a near-eye display according to at least one of the implementations herein;

FIG. 7 is a flow chart of an example method of highly efficient image rendering for near-eye light field displays according to at least one of the implementations herein;

FIGS. 16A-16F are images of experimental results using at least one of the implementations disclosed herein.

FIGS. 17A-17B are more images of experimental results using at least one of the implementations disclosed herein.

DETAILED DESCRIPTION

Figure 1:
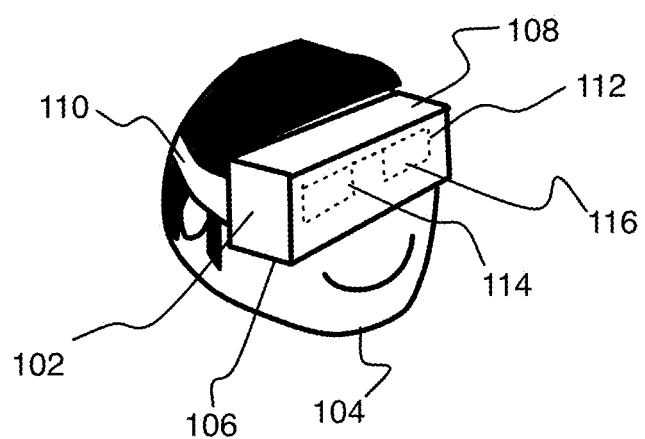
FIG. 1 is a schematic diagram of an example near-eye display setup according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, commercial devices, and/or consumer electronic (CE) devices such as computers, laptops, desktops, servers, tablets, set top boxes, game consoles, and so forth, and as well as mobile smart devices such as hand held game devices, smartphones, smart headphones, smart glasses, and head mounted displays (HMDs) themselves, as long as the device performing the image processing can locally or remotely provide images to an HMD or other near-eye display for timely display. The term HMD mentioned anywhere herein refers to any device that is able to hold near-eye light projecting displays described herein in front of, and close to, a person's eyes. When captured images are used instead of, or in addition to, artificial computer generated images, the image processing device may be, or may be remotely connected to, digital cameras, smartphones, tablets, or gaming devices with cameras, webcams, video cameras, and video game panels or consoles.

Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination of these The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, devices, and methods of highly efficient image rendering for near-eye light field displays is described herein.

Light-field technology is used for display systems, camera or image capture systems, and content playback. In the context of near-eye display systems such as with HMDs, light field displays allow for controlling both the location of image content (as in 2D displays) and the directionality of light emitted from the display. This allows for a far more realistic depiction of natural scenes with enhanced realism and comfort, especially with VR and AR HMDs.

Some conventional near-eye light field displays use direct ray tracing to render the image. A near-eye display may be divided into elemental images each with a block of pixels and where each elemental image is formed with a slightly different perspective of a 3D scene due to the placement of a lenslet paired with that elemental image. An array of such lenslets aligns with a light emitting layer of the display at some spacing from the display. For rendering, each lenslet can be considered to have its own camera view of the scene to be displayed. Thus, rays are traced from the lenslets on the near-eye display to 3D modeled objects that form the scene to be placed in an image, and so that each elemental image has a slightly different perspective of the same scene. The intersection of the rays on a display with a display plane positioned between the lenslets and modeled objects of the scene (referred to herein as a scene model) indicates the elemental image and pixel image data locations on a full integral image or display.

While the computational load demands of these light field systems are generally lower than computer-generated holography, this directional capability incurs a substantially high computational burden, particularly when high resolution perceptual output (such as HD, 4K, or 8K equivalents) is needed to provide adequate images to a user wearing an HMD for example. When the resolution is not high enough, this often causes sub-pixel aliasing artifacts, as low-resolution views would need to be reprojected to a novel viewpoint with millimeter (or less) precision. It should be noted that an eye box is on the scale of a human eye and/or pupil (2 to 8 mm wide) with views distributed within that space. These problems are known to plague view-based reprojection methods for this type of display system.

Other conventional normal or far-eye deep learning supersampling (DLSS) systems allow for input images of low resolution to be realistically upsampled via machine learning methods prior to display to achieve the desired high resolution. This has not been successfully implemented with near-eye displays yet because it does not factor other near-eye display specific difficulties such as the very low resolution of the undersampled elemental images desired as input into such a DLSS system or repetitive integral image structure which must be maintained within a tight tolerance for correct optical light-field behavior. Furthermore, a conventional DLSS applied wholesale to the entire integral image may be expected to synthesize excessive detail, leading to networks that operate poorly in images from unfamiliar scenes or domains.

When conventional high resolution systems are being used by near-eye displays, the computational cost is extremely high for gaming and/or graphics on 8K display systems. The computational load is often very high because the rendering process must perform complex shading calculations at these native resolutions.

Furthermore, for light-field display systems considered herein, the use of either rasterization and/or ray-tracing to render the image on the display struggles with unique challenges. Rasterization, in this context, often requires a large quantity of different camera frustums (well beyond the stereo or multi-view scene of existing conventional systems), rendering passes, and post-processing. A camera or viewing frustum is a region of space in a modeled world that may appear in an image. The adequacy of ray or path tracing with high underlying display resolutions is impractical or wasteful because the elemental images are very redundant, where a large amount of image data from elemental image to elemental image is substantially similar.

While artificial intelligence (AI) such as near-eye display deep neural networks (DNNs) could be attempted as the main rendering engine, so far these are also largely impractical. A possible approach may input both the extremely large amount of near-eye display data and depth maps into a NN. This arrangement, however, places a heavy burden on the DNN to learn red, green, blue, depth (RGBD) multireprojection and reconstruction under varying image structures due to changes in light field display configurations. While this may be possible, it requires much more complicated methods to overcome the typical limited receptive field of a practical DNN and makes controlling intermediate stages of the process very difficult.

To resolve the issues mentioned above, the present method and system implements a pipeline to dramatically reduce the rendering computational cost of near-eye light field displays systems when integral images are generated. This is accomplished by sparsely rendering root elemental images and then projecting the root elemental image(s) to other elemental images on the integral image. This substantially reduces the computational load since less than all of the elemental images of an integral image are generated by using rasterization and/or ray tracing from a 3D model of the scene to be displayed, referred to herein as sampling of pixel data. Particularly, and by one form, the elemental images generated by the rasterization or ray tracing are referred to as root elemental images, and the number of root elemental images may be sparse to significantly reduce the computational load of the rendering. By one form, the root elemental images are then used to generate all or individual ones of the other (non-root) elemental images. By one approach, the root elemental images are projected to generate the other elemental images using projection matrices. This projection may be referred to as n-way elemental image-to-elemental image reprojection since the root elemental images can be projected in any desired direction to another elemental image. The root elemental images may be located in predetermined patterns on the integral image. In one form, the sparsity of the root elements can be one in every 16 elemental images for every 4×4 cluster or superblock (SB) of elemental images on the integral image. Many other variations are contemplated.

Since the use of the sparse root elemental images yields large reductions in sampling of the image data (or scene model), this results in an extremely large reduction in computational load. The reliance on projection from root elemental image to non-root elemental images reduces the computational load because photorealistic rasterization, shading, and ray tracing methods are generally far more expensive in computational cost than projection matrix computations, for example. The use of the root elemental images also may allow for efficient mapping of the operations onto tile-based GPU architectures, for example, which is not so straight forward with ray tracing for example.

The reprojection process can be performed in a forward or reverse pipeline. The forward pipeline uses a pixel location on a root elemental image to compute a pixel location on another elemental image. In some cases, the computed pixel location does not correctly match a pixel within a non-root elemental image position being reconstructed because of artifacts due to reprojection of anti-aliased root depth values. Furthermore, a multi-root/multi-pass implementation with forward mapping may perform excessive computation, overwriting the same destination pixel location in a non-root elemental image multiple times with substantially similar content. Thus, a reverse pipeline may be used where a non-root elemental image is selected for reconstruction. In this case, a non-root pixel location in the non-root elemental image is used to compute a root pixel position in a root elemental image. The reverse computation may be more accurate and/or faster because it relies on a texture sampling operation, which can make use of hardware-accelerated texture interpolation. Furthermore, the reverse pipeline for a particular pixel can terminate when it finds a suitable root pixel, leading to greater efficiency.

This arrangement is successful largely because motion parallax is limited to the space of a human pupil (such as 2-8 mm). The motion parallax causes retinal blur in near-eye displays. Since the motion parallax is so small, small artifacts of this size should be tolerable if noticeable at all, thereby providing a satisfactory balance between image quality and computational load. This multi-way reprojection works despite view-dependent effects (reflections, specularity, etc.) since the baseline view changes in a near-eye display is limited to roughly the size of a human eye. In practice, most artifacts at that scale are better tolerated and usually occur in regions naturally defocused by the eye.

By an alternative, point-sampled (or aliased) input images may be used to avoid artifacts resulting from reprojection, such as from multi-sample anti-aliasing (MSAA). This may be accomplished by applying jitter in multiple reprojection passes for the same pixel location (on the root EI when using the forward pipeline). The jitter may nudge image data positions, such as by fractions of a pixel, for each pass. The reprojection process from selection of projecting EIs to output of initial integral image EIs may be performed with each pass. The iterations are then combined to form a single non-root EI. It should be noted, however, that a jittered multi-pass approach may be more expensive than a filtering-based method that uses fully anti-aliased input images to construct the source scene model.

It also will be understood, however, that the generation and reprojection of root elemental images rather than generation of all elemental images by directly rendering the scene model will necessarily cause large disocclusion artifacts such as holes as well as other artifacts. This occurs because each elemental image has a slightly different perspective of the scene model such that that each elemental image (EI) can show different parts of the scene model not visible on other elemental images, and even though all of the elemental images are showing the same scene model.

With the larger artifacts, either these can be prevented or easily removed or reduced. For example, the rendering of the root elemental images very well may include an anti-aliasing operation to remove the blockiness (or pixelation) of object edges in the source scene content of the scene model. The anti-aliasing itself, however, causes color and depth noise blurring that loses original depth information. Simply interpolating or copying depth data from surrounding pixels in this case can be insufficient and can therefore cause severe artifacts that are not easily fixed without a deeper more complex inpainting NN.

To attempt to limit artifacts due to incorrect or missing depth information, a ground truth depth filter may be used. For this operation, the system may discard pixels reprojected from a root elemental image to another elemental image if the projected depth at the destination pixel location does not agree with a pre-generated depth map. Thus, the errant pixels are simply discarded in favor of post-processing reconstruction. This also may include re-sampling operations that re-render the discarded pixels or repeat the reprojection process for holes with missing pixel data for example. The re-sampling also may be sparse by correcting every nth pixel in a hole, such as $8^{th}$. The sparse pixel re-sampling operation helps the reconstruction NN retain a tighter locality in its feature extraction for fine NN architecture layers and other reconstruction operations.

Whether or not the re-sampling is performed, the initial integral image resulting from the reprojection may be reconstructed by using a neural network (NN) to fill holes and smooth the image (perform in-painting) and depth data.

Referring to FIG. 1, one example system 100 may have a head mounted display (HMD) 102 to be used to display near-eye images according to at least one of the implementations herein, and whether the image processing to generate the images is performed on the HMD 102 or remotely from the HMD 102. The HMD 102 is shown mounted over a user's eyes on the user's head 104 using a strap 110. The HMD 102 may have a body 106 with a binocular pair of near-eye light field displays 112 including a right eye near-eye display 114 and left eye near-eye display 116. The displays or display screens 114 and 116 face the user's eyes and may be used to display virtual reality (VR) or augmented reality (AR) images. The displays show the virtual or augmented reality to the user 102 so that the user is provided a personal point of view (POV) as if the user was within that displayed reality world. The HMD 102 may have an enclosed body 106 as shown or may be much more open such as with see-through smart glasses that provide AR.

Figure 2:
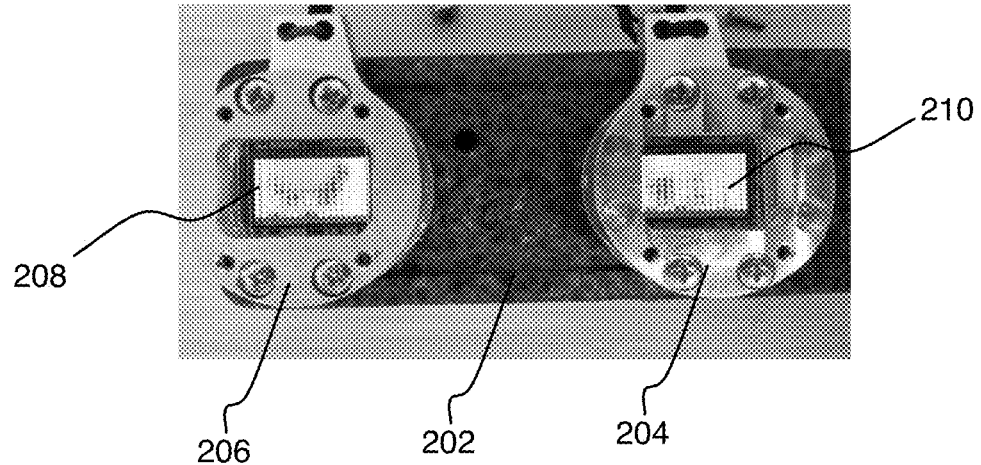
FIG. 2 is an illustration of an example near-eye display according to at least one of the implementations herein.

Referring to FIG. 2, an interior view of an example HMD 200 may have a connecting support or bridge 202 and two near-eye light field displays 204 and 206. Near-eye screens 208 and 210 on each display 204 and 206 are shown displaying an integral image. The displays used herein are typically organic light emitting diodes (OLEDs) forming the physical pixels on the displays 204 or 206, but may emit light by other techniques.

Figure 3:
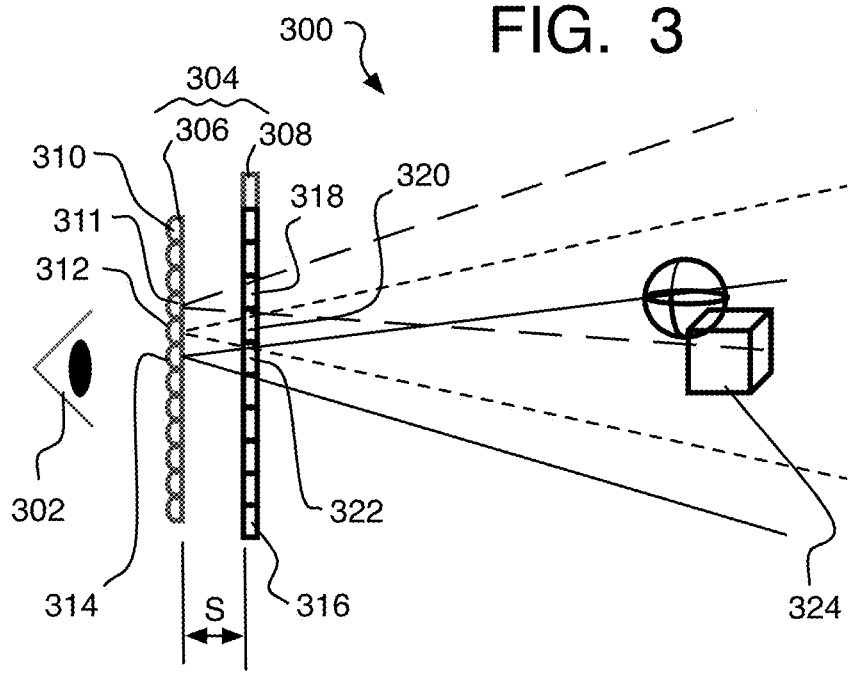
FIG. 3 is a schematic diagram of a side view of a near-eye display setup according to at least one of the implementations herein.

Referring to FIG. 3, a near-eye display setup 300 shows a near-eye display 304 where rasterization or ray tracing may be used to generate root elemental images on the display. In this setup, a user's eye 302 is near to the near-eye light projecting display 304. The display 304 may have an array 306 of elements 310 that are spaced by a short distance S from a display plane or pixel array 308 that may be physically or virtually divided into elemental images 316. While not shown, the pixels of pixel array 308 may have light emitting diodes to provide the lighting for the display 304. The elements 310 may be lenslets that each project to a view or viewing frustum with a slightly different shape from other frustums in the array 306 and that are directed to a center point of the user's eye or other point for example. Each lenslet has a corresponding elemental image (EI) 316 on the pixel array 308. In this example, elements 311, 312, and 314 are respectively aligned with EIs 318, 320, and 322 along rays from the user's eye 302, through the EIs 318, 320, and 322, and shown here out to a scene model 324 with the objects to be displayed as image content on the display EIs 318, 302, and 322. The positioning of the scene model 324 is not an actual physical event in front of a user, but is merely a representation of the optics involved to compute the image data as disclosed herein.

A difference in perspective (or 3D disparity) exists for each element 310. In the current example, the correspondence between elements 310 and EIs 316 is shown by upper and lower ray limit lines originating from a single origin point on the elements 310. In this example, element 311 shows the perspective of the scene model 324 in large dashed lines intersecting EI 318, element 312 shows the perspective of the scene model 324 in small dashed lines intersecting EI 320, and element 314 shows the perspective of the scene model 324 in solid lines intersecting EI 322.

With this arrangement, ray tracing can be performed to generate root EIs by considering the individual element corresponding to a root EI to have a camera facing the EI 316 on the display plane (or pixel array) 308 and the scene model 324. A ray is then traced from the camera (or element or lenslet) center, through a corresponding pixel on the EI 316 on the display plane 308, and then extended onto the scene model 324. Wherever the ray intersects the scene model 324, the color, brightness, and depth at that point of the scene model 324 is provided to the corresponding pixel on the EI. This may be repeated for all pixels in the root EI.

Rasterization when used instead of, or with, ray tracing, may be used when the scene model 324 is divided into a mesh often of primitives such as triangles. In this case, just the vertices of the triangles are projected using matrix multiplication of the vertex position and a mathematically determined projection matrix. The projection matrix maps scene points to coordinates within the desired root EI on the display plane 308. The rasterization process then usually performs clipping to discard any projected points falling outside the desired elemental image, having already predetermined the extent of the elemental image on the display. Using attributes typically stored at the vertices of the primitives, a color value is calculated via shading and texturing methods. Then, the rasterization process assigns the projected points into screen space pixel coordinates for assignment to the display buffer.

Figure 4:
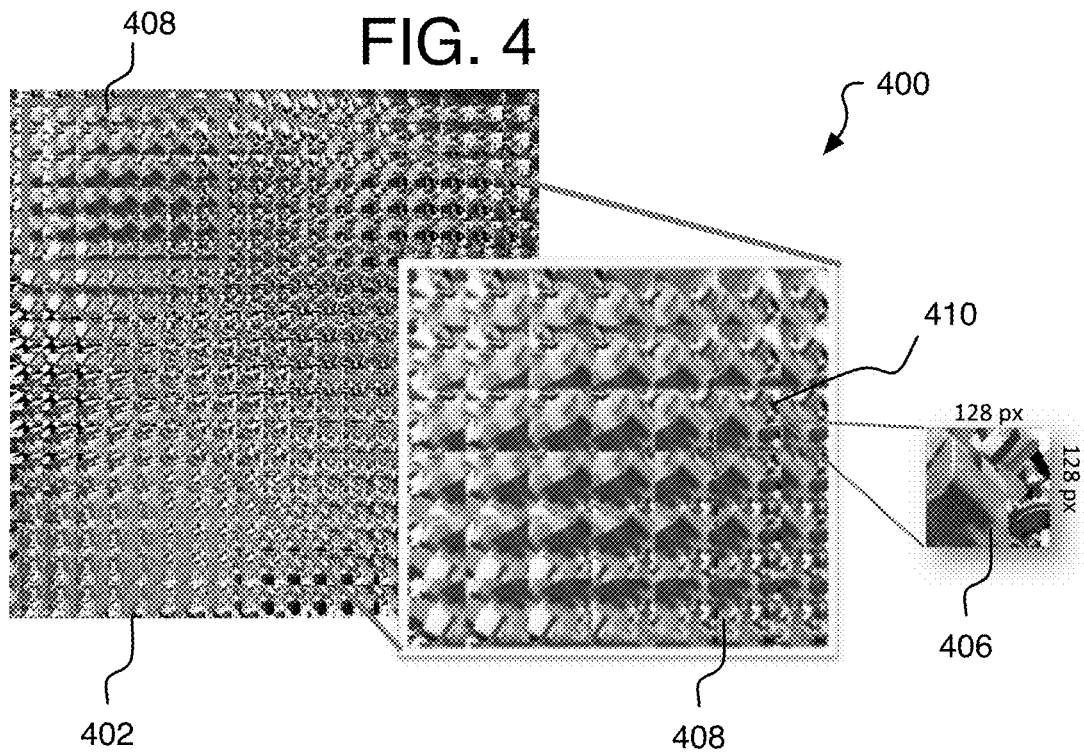
FIG. 4 is a set of illustrations showing example elemental images for a near-eye display according to at least one of the implementations herein.

Referring to FIG. 4, a diagram 400 has an example integral image 402 of any of the example near-eye displays 304, 112, or 200 to show the relationship with EIs. A close-up section 408 on integral image 402 has individual EIs 406 at EI locations 410 on the integral image 402. By one example form, each EI 406 may be 128×128 pixels but many variations can be used with the present method.

Referring to FIG. 5, an integral image 500 is used to show the amount of redundancy between elemental images. It can be seen that local areas of the elemental images are substantially redundant from one elemental image to the next, such as EI 502 and EI 504. At least some differences exist, however, between the EIs even though the EIs are relatively close to each other on the integral image 500. This shows how the reprojection cannot reproduce an entire EI perfectly and holes will usually need to be filled for many of the EIs when the integral image is of a scene that is not flat or uniform, such as with sky or a painted wall.

Figure 6:
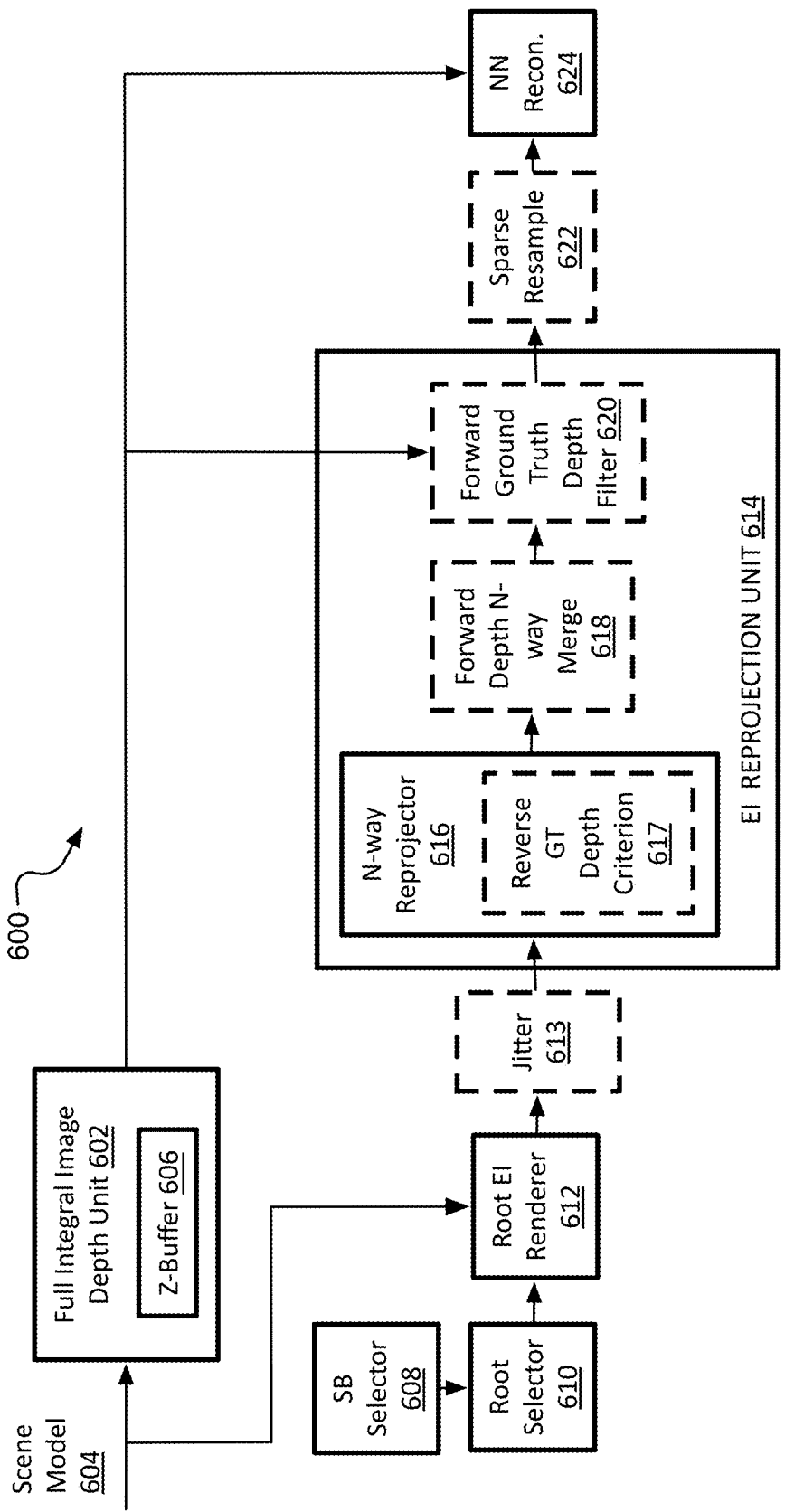
FIG. 6 is a schematic diagram of an example image processing system arranged according to at least one of the implementations herein.

Referring now to FIG. 6, an example image processing system or device 600 is provided to render a full integral image for a near-eye display according to at least one of the implementations herein. The system 600 may have a full integral image depth unit 602 that receives scene model data 604, or more precisely data that could be used to build a 3D model, or is data of the already built 3D model, and of a scene with content that is to be captured in the rendered images. This data may be referred to herein collectively as a scene model.

The scene model may be formed of a mesh with 3D primitives, such as triangles, and may include image data, such as RGBD image data at the vertices of the primitives. The scene model, however, could be provided in different forms or stages. Optionally, the full integral image depth unit 602 may use the scene model data 604 to generate a separate depth map to store in a Z-buffer 606 or may simply receive a separate depth map accompanying the scene model or scene model data.

System 600 also may have a superblock (SB) selector 608, a root selector unit 610, a root EI renderer 612, an optional jitter unit 613, an EI reprojection unit 614, an optional sparse re-sample unit 622, and a neural network reconstruction (or NN) unit 624. The EI reprojection unit 614 may have an N-way reprojector unit 616 with a reverse ground truth (GT) criterion unit 617, a forward depth N-way merge unit 618, and a forward ground truth depth filter unit 620.

Preliminarily, the available SB and root EI pattern(s) for integral images may be predetermined, and may be available in many different variations. One example used herein is to use SBs of 3×3 to 6×6 EIs with one root EI per SB, and when a single root EI has about 128×128 pixels. SB sizes smaller than 3×3 EIs may not fully take advantage of possible reduction in work load, and sizes larger than 6×6 EIs might be too inaccurate and cause too many artifacts, depending on the pixel sizes of the EI and number of root EIs in an SB. By one pattern, a single root EI is near each of the four corners of an SB. Many variations are contemplated. It will also be appreciated that structures other than SBs could be used, such as segmented and detected objects, and so forth.

In operation, the SB selector 608 sets which SB (or other large pixel structure) in an integral image will be worked on, and provides a new SB as previous SBs are rendered. Likewise, the root selector 610 selects the root EI to work on as previous root EIs of an SB, or other non-SB structure, are being rendered. The root EI renderer 612 obtains image and depth data from the scene model and renders the root EI by using ray tracing, rasterization, shaders, and/or other techniques or applications that directly use the image data or scene model (also referred to herein as sampling), and rather than directly rendering all EIs, thereby substantially reducing computational load. The rendering operations also may include pre-processing such as noise removal and post-processing operations such as anti-aliasing.

The optional jitter unit 613 may be used to reduce artifacts caused by multi-sample anti-aliasing (MSAA). The jitter unit 613 sets the EI reprojection unit 614 to generate non-root pixel data, and in turn data of non-root EIs, in multiple iterations by slightly shifting the image data by some fraction of a pixel for each iteration. The iterations are then combined, either on a per-pixel or per EI basis, by averaging, summing, or other combining operation. This tends to reduce the artifacts caused by the loss or undesired change of depth data during smoothing of edges performed by anti-aliasing.

The N-way reprojector 616 then reprojects the image data of the root EIs (or source) to other (or non-root or destination) EI locations to generate the other EIs. The reprojector 616 performs the reprojection algorithms described herein including projection matrices or other techniques. As to the operations for obtaining pixel locations for the projections, this can be performed in a number of different ways. By one approach, a reverse-mapped or forward-mapped reprojection may be used. In forward-mapped reprojection, the N-way reprojector 616 selects a root EI pixel location and reprojects the root EI pixel location to find a corresponding non-root EI pixel location in each of the non-root EIs assigned to the current root EI. The image data is copied from the root EI pixel to the corresponding non-root EI pixels.

Thereafter, the depth (Z-buffered) N-way merge unit 618 collects the generated EIs and places them on the integral image. The depth of the pixel locations may be adjusted as the pixels are being analyzed when the depth of a pixel is not sufficiently close to pixel locations near a current pixel location in attempt to remove outlier depths.

As another option, when a ground truth depth map is provided from the input or scene model, the ground truth depth filter unit 620 may compare the depth of the pixel locations to a ground truth depth threshold that indicates a maximum acceptable difference between the depths. The ground truth depth filter 620 then drops the pixels when the depth of the pixel does not meet the threshold. This also assists to reduce the artifacts from anti-aliasing and other errors in the rendering process.

In the reverse-mapped reprojection, the n-way reprojector 616 first selects a location of a non-root EI pixel location and reprojects the non-root EI pixel location to a root EI to find a corresponding root EI pixel location. In this reverse case, the reverse GT depth criterion unit 617 then compares the depths of ground truth to the depth of the image data (or sample) of the corresponding root EI pixel location. If the depths do not sufficiently match, the system attempts to match the non-root pixel with other root EIs. When the depths do sufficiently match, the non-root EI pixel location receives the image data of the corresponding root EI pixel. The matching and projection is stopped for a non-root EI either when a match is found or all iterations with root EI match attempts are done. The process then proceeds with re-sampling and/or NN reconstruction. The depth-sorting forward units 618 and 620 are not used for the reverse-mapped reprojection. Those pixel locations missing image data after any of the processes mentioned above are assigned, or maintained when initially set as defaults with, the color black and a depth at infinity or very far to indicate a hole exists.

The system 600 then optionally may use a sparse re-sample unit 622 to re-sample pixel locations at points of missing data in holes or pixels with distorted data. As mentioned, this may involve re-rendering, or reprojecting for every nth pixel in a hole for example. Distorted image data artifacts could also be detected and re-sampled. Thereafter, the reconstruction neural network (NN) unit 624 may be used to reconstruct and in-paint the integral image to further reduce hole sizes and/or smooth the image data. Other details of the operation of system 600 may be provided below with processes 700, 800, 900, and 1000.

It will be appreciated that other components not shown may be provided for the system 600, such as those shown with systems 1800, 1900, and/or 2000 described below. It also will be appreciated that a depicted component includes code and/or hardware to perform the function of the depicted component and actually may be located in a number of different places or components on a device that collectively perform the recited operations of the depicted component.

Referring now to FIG. 7, by one approach an example process 700 is a computer-implemented method of highly efficient image rendering for near-eye light field displays. In the illustrated implementation, process 700 may include one or more operations, functions, or actions as illustrated by one or more of operations 702 to 708 numbered evenly. By way of non-limiting example, process 700 may be described herein with reference to example image processing systems 600 and 1800 of FIGS. 6 and 18 respectively, and where relevant.

Process 700 may include "generate root elemental images being less than all elemental images on an integral image having content of a scene" 702. By one example, this may refer to rendering sparse root elemental images at intervals that may be fixed, may vary over time, or may depend on the image data such as image content complexity, or depth variation. By one approach, the root elemental images are uniformly provided per superblocks of EIs. One form of this example has a root EI at or near one or more corners (or all corners) of a superblock. By one form, one root EI is placed in the upper left corner EI space of individual SBs. By one form, a superblock may have 3×3 to 6×6 EIs when each EI has about 128×128 pixels. Many variations for superblock (SB) characteristics and root EI positions are contemplated.

Process 700 may include "wherein each elemental image is of a different light projecting element on an array of the elements forming a near-eye display" 704, where in this example, an array of elemental images (EIs) may correspond to an array of elements, such as lenslets each forming a different viewing frustum, in a one to one manner.

Process 700 may include "use the root elemental images to generate other elemental images of the integral image" 706. As mentioned herein, the root elemental images may be projected to non-root (or other) elemental image positions, and the image data of the root elemental positions may be copied to the non-root elemental images. By one form, this is performed on a pixel by pixel basis. This can be performed in a forward-mapped operation where a pixel location of the rendered root elemental image is projected to determine a corresponding pixel location in a target non-root EI, or in a reverse-mapped operation where a pixel location of the non-root EI is projected to find a corresponding root EI pixel location. By one approach, some SBs may use forward reprojection while other SBs may use reverse projection, and this may depend on some criteria such as image complexity. Also, a jitter option may be used with the forward-mapped reprojection to generate non-root EIs over a number of non-root EI iterations, where the iterations are combined to form a single non-root EI. The iterations may be combined pixel by pixel.

Process 700 may include "provide the root and other elemental images to display the integral image on the near-eye display" 708. This involves collecting the EIs and placing them in an integral image. By one approach, the depth-sorting operations may be applied. By one approach, depth data may be adjusted when depth of a non-root EI pixel does not match previously filled non-root EI pixels. By another approach, depth data, such as from a depth map or Z-buffer, may be used as a threshold. In this example, the image data of a non-root pixel is kept in the EI when the depth value of the non-root pixel is within a threshold of ground truth. Maintaining such depth data restrictions better ensures occluded objects in an image will be rendered at the correct depth, and particularly when anti-aliased data was used to render the root EIs.

Once the initial integral image is formed, post-processing can be performed to fill holes, refine image data, or in-paint the image data. This optionally may include re-sampling the image data which refers to repeating the reprojection process for pixel locations in holes with missing image data on an EI, or pixel locations with distorted, incorrect image data. Thereafter, whether or not re-sampling is performed, a reconstruction neural network (NN) may be used to reconstruct and in-paint the integral image to further fill holes and refine the image data. The integral image then can be stored, shown on a near-eye display, or transmitted to such a display.

Figure 8:
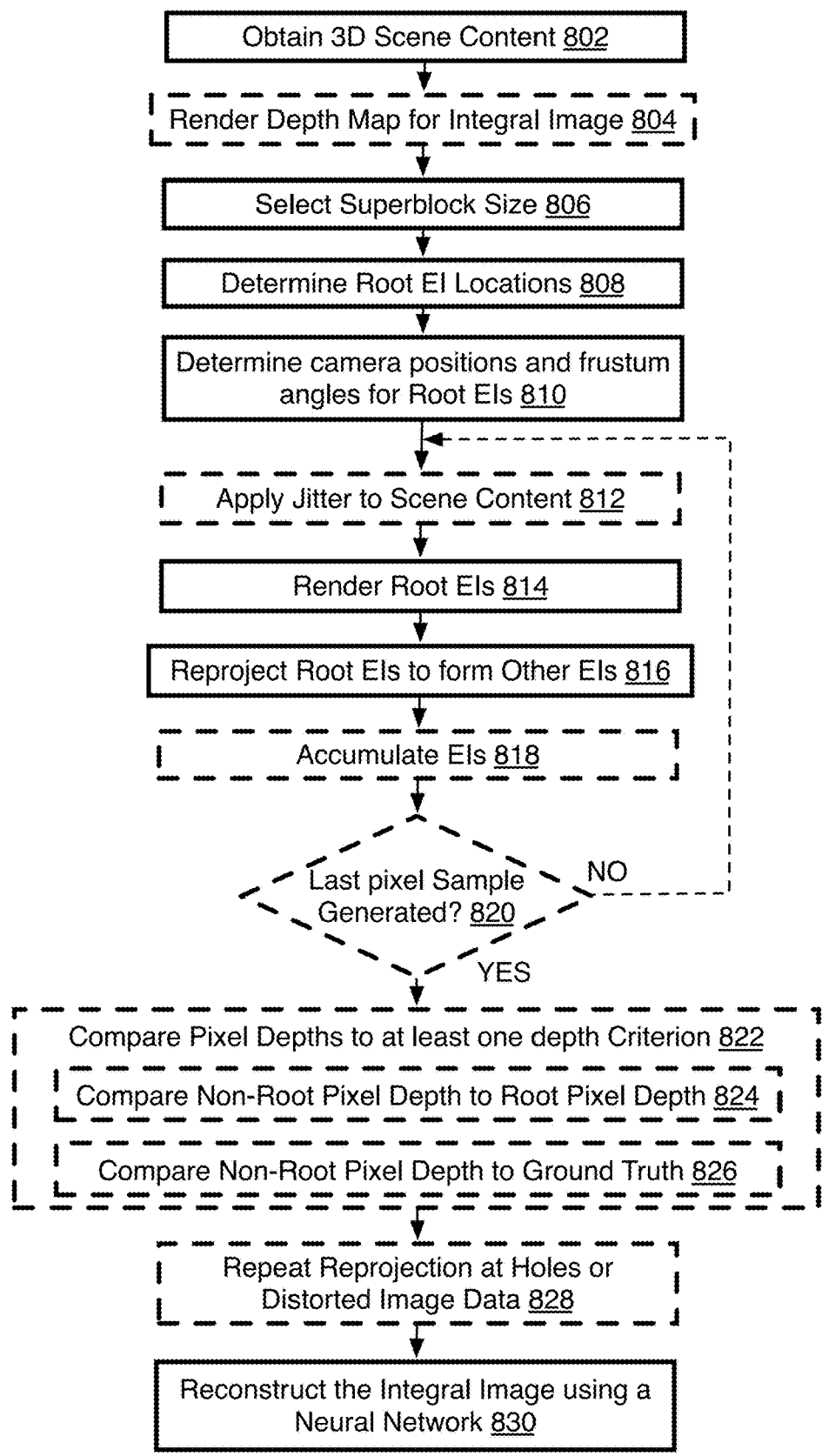
FIG. 8 is a detailed flow chart of an example method of highly efficient image rendering for near-eye light field displays according to at least one of the implementations herein.

Referring now to FIG. 8, an example process 800 is a computer-implemented method of highly efficient image rendering for near-eye light field displays. In the illustrated implementation, process 800 may include one or more operations, functions or actions as illustrated by one or more of operations 802 to 830 numbered evenly. By way of non-limiting example, process 800 may be described herein with reference to example image processing systems 600 and 1800 of FIGS. 6 and 18 respectively, and where relevant.

Process 800 may include "obtain 3D scene content" 802, and this refers to either obtaining the data of a 3D model or the data that could be used to form a 3D model such as 2D image data and accompanying depth data such as a depth map (or Z-buffer). Such a depth map may be formed by processing 2D images with a stereo algorithm. Otherwise, a depth map may be generated by the computer graphics program constructing the scene model when the scene is computer generated, synthetic, and/or animated. In one form, the input image is only rendered either from computer graphics or from images (including captured images) plus depth data for a sparser set of elemental images. A scene model can include any of these features mentioned. This represents the original image content that is to be rendered in the integral images.

If not done so already, process 800 optionally may include "render depth map for integral image" 804. Here, a depth map may be generated for the entire integral image using only primary rays cast into the scene and held in a Z-buffer. In another example, the depth map may be generated by rasterization of the scene into a Z-buffer. If this is not provided, the reconstruction NN described below may be trained for deeper reconstruction.

To begin undersampling operations to render the root EIs, process 800 may include "select superblock size" 806. By one form, the EIs may be arranged in blocks, and here square blocks, referred to as superblocks (SBs) herein. This may be predetermined and may be set so that root EIs will project to non-root EIs a maximum distance of EIs (in a variety of directions (N-ways)) within an SB that can still provide a sufficient amount of redundancy to increase efficiency rather than relying too much on post-processing inpainting correction. The minimum distance between root EI and non-root EIs, which increases the number of root EIs, should not be so small that computational load reduction becomes insignificant. By one form, the SBs were set at 3×3 to 6×6 EIs when an EI has 128×128 pixels for greatest efficiencies, and with one root EI per SB.

Closely related to the SB determination, process 800 also may include "determine root EI locations" 808, and when SBs are being used, it may be predetermined precisely with the position of one or more EIs of an SB that will be the root EI. By one form, the upper left corner of an SB will be the root EI for that SB.

Figure 11A:
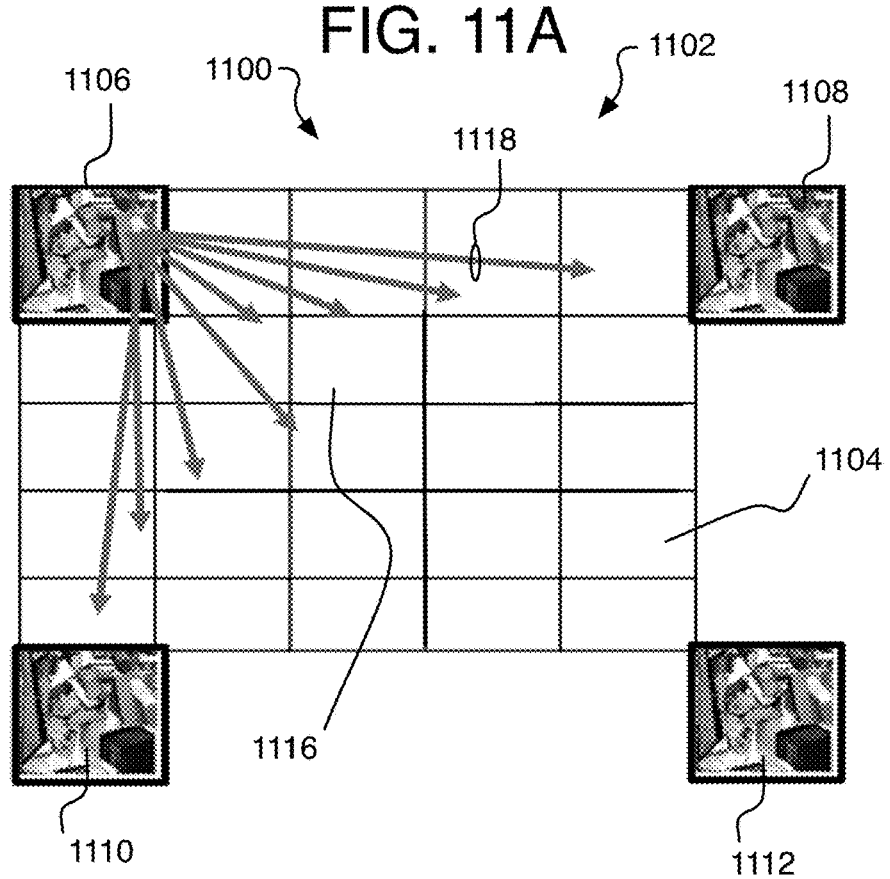
FIG. 11A is a schematic diagram showing elemental image reprojection according to at least one of the implementations herein.

Referring to FIG. 11A, an example integrated image 1100 has a 5×5 EI superblock 1102 with a single root EI 1106 in the upper left corner of a grid of the EIs 1104 forming the superblock 1102. Thus, the root EI sampling ratio here is ½5. In this case, root EI 1106 may be projected to fill pixels in non-root (or other) EIs 1116 in the SB 1102, and as shown by the projection arrows 1118. The projection is not limited to a particular direction (hence, N-way projection). As described below, this may be performed on a pixel by pixel level.

Figure 11B:
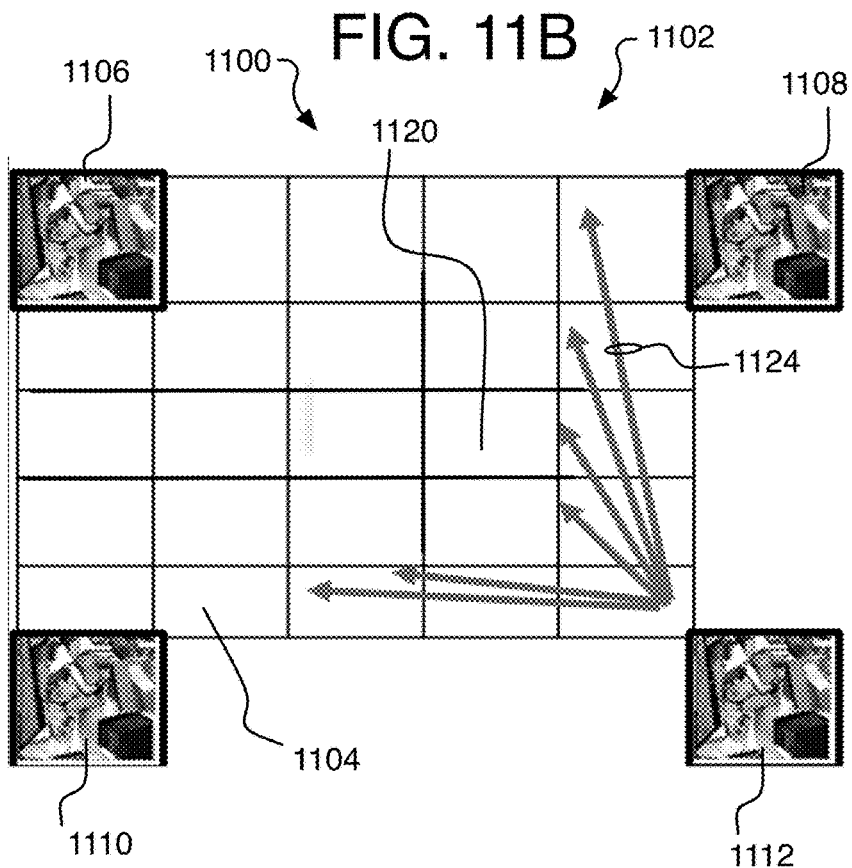
FIG. 11B is another schematic diagram showing elemental image reprojection according to at least one of the implementations herein.

Also, it will be noted that the root EIs 1108, 1110, and 1112 from the upper left corners of adjacent SBs are near (or nearest to) the current SB 1102 and particularly to the corners of the SB 1102 so that the root EI pattern can be described as the root EIs being at (or near) the corners of the SBs 1102. Thus, although upper left root EI 1106 may be the only root EI positioned within the SB 1102 to form the sampling ratio for that SB 1102, other root EIs 1108, 1110, and 112 from adjacent SBs may be closer to non-root EIs within the current SB 1102 than the root EI 1106. In this case, it is better to use those adjacent root EIs 1108, 1110, or 1112 to project to non-root EIs. For example as shown in FIG. 11B, root EI 1112 may be used to fill pixels in a non-root EI 1120 as shown by arrows 1124. The root EI 1106 is farther from non-root EI 1120 than root EI 1112. The other two corner root EIs 1108 and 1110 will have a similar projection. It also will be noted that FIGS. 11A-11B and the fixed intervals, or SB sample ratio, are all examples and many variations exist. While the SB is 5×5 EIs and a ¹/25 root EI sampling ratio, the testing described below worked with a ¹/16$^{th}$ sampling ratio, with a goal of reducing pixel-wise rendering costs by about 90%.

It also will be appreciated that the root EIs may be arranged on superblocks in locations other than all corners, but still along the borders of the SBs, such as along one or more sides of the SBs. In any of these cases, not all SBs may have root EIs and either the projection is skipped for a non-root's EI in a first SB or non-root EIs of the first SB use root EIs from another SBs. In other cases, the root EIs may be positioned within the interior of the SBs, such as a center or other location within the SBs, and whether arranged, horizontally, vertically, or diagonally, or in any other pattern, as long as root EIs can be rendered without the need to render all EIs by directly using the data of the scene model.

By other methods, the root EI patterns, or SB sizes and positions if used, may vary by image content complexity where for example a uniform or flat field on an image, such as image content of the sky or a wall, may have much larger SBs or much smaller root EI sample ratios, while complex image content of a picture of busy streets in a city or complex abstract scene, and so forth would have much smaller SBs or larger root EI sample ratio.

Likewise, the root EI positions may vary by the complexity or range of the depths in the scene, and according to a depth map or Z-buffer for example. Thus, when an integral image is more uniform in depth, such as with a planar background and a person in the foreground resulting in a mere two general depths, the SBs may be larger and the root EI sample ratio may be smaller versus integral images with many more varying levels of depth. The root EI spacing may be determined by heuristics in these cases in order to maximize SB reprojection coverage by a root EI. The choice of SB size and ratios also may be driven by a machine learning process that has learned to infer such heuristics, given scene content information and light-field display parameters.

By yet another option, a temporally-driven variation may include a heuristic method to dynamically choose the location (or more precisely, the spacing or root EI sample ratio) given an existing depth map over successive frames. In this case, the position of the root EI may be based on a combination of the depth maps over time, such as an average, where the position of the root EI may change depending on the average variations of the integral image over time. The position of the root EI also may be based on a history of motion vector (or velocity) buffers, each of which describe the pixel-to-pixel (or pixel block to pixel block) relationship of observed points in the scene across relative time frames (from frame to frame). By one approach, the velocity buffers themselves may be arranged in a similar structure to the integral image, forming an integral image velocity buffer. Such pixel-level temporal or scene motion variation information may be used to set the root EI positions and may further improve image quality and/or reduce the need for the re-sampling and NN reconstruction discussed herein.

By other alternatives, SBs are not used, and detected or recognized object shapes may be used instead. In this case, root EIs may be set at one or more key points of an object for example. Many variations are contemplated.

Process 800 may include "determine camera positions and frustum angles for Root EIs" 810. These are preliminary operations used to perform the ray tracing and/or rasterization to render the root EIs. The camera positions refer to the virtual camera position at the lenslet centers (or principal points, if using a thick lens approximation) and with the camera facing the display plane, and in turn EIs, as well as the scene model as described above with setup 300 (FIG. 3). By one form, the lenslets may be bi-convex or plano-convex lenses. A single center ray angle may be set at a camera center at the center of the lenslet surface facing the display plane 308 and extend to the center of the root EI to be rendered. The angle of the ray for individual pixels can then be computed using the center ray. Otherwise, in a pinhole method, the ray for the other pixels may be set by extending the ray from the lenslet center (or principal point) to a physical point on the display (the EI) and forward to the 3D model of the scene model. The angles of the rays at the camera and elements should remain fixed from integral image to integral image, while the image content on the scene model may change. In a rasterization-based version, the viewing frustum may be computed using a projection matrix described below and used for reprojection herein where the coefficients of the matrix use the positions of the elemental image boundaries relative to the lenslet center or camera origin.

When the rendering of the root EIs include anti-aliasing, as mentioned above, depth data and other image data details may be lost due to the smoothing of the image data. In this case, optionally, process 800 may include "apply jitter to scene content" 812. This optional jitter application adapts multi-sample anti-aliasing (MSAA) rendering into the pipeline itself to provide smoother edges. Thus, jitter iterations are generated and combined rather than reprojecting anti-aliased root EIs directly, which may result in too many quality-reducing artifacts at object edges in the EIs, requiring greater compensation later in the pipeline. In the present jitter option operation, the scene model (or source frame) is rendered multiple times using sub-pixel jitter. However, this operation may require more memory and scaling depending on the degree of multi-sampled anti-aliasing desired.

To apply the jitter, once a root EI is ready for rendering, either the image data of the scene model or the image data of the resulting rendered pixels in the root EI are shifted relative to the camera for each iteration. More particularly, the camera position may be shifted while the frustum extents (l, r, t, b described below) may be shifted in the opposite direction of the camera shift when rasterization is being used, and ray angles may be re-computed given the newly shifted camera position and fixed points-of-interest in the elemental image when ray tracing is being used. Thus, each iteration nudges the image data of the root EI a fraction of a pixel in a horizontal, vertical, or combined direction, such as a random sub-pixel offset for each iteration, such as for four iterations to name a random example, and may be predetermined and fixed for all root EIs. By one approach, the sub-pixel offset may be drawn from a Halton sequence. The amount and distance of the iteration may be determined by experimentation. By one alternative, the jitter may be different at individual root EIs, and in another alternative, the jitter may be randomized for each root independently, and within some acceptable range, rather than applying the jitter uniformly to all root cameras in each pass. This may further assist with greater in-painting accuracy later.

Each (aliased) jitter pass is then independently run through the SB reprojection operations. The resulting integral image iterations are then combined (whether pixel by pixel, EI by EI, integral image portion by integral image portion). Once a single integral image is generated, the single integral image is passed on for image data correction, refinement, and reconstruction. By one form, the iterations may be averaged or summed with non-uniform weights determined by experimentation.

Process 800 may include "render root EIs" 814, and this may be performed by ray tracing, rasterization, and other technique to render the root EIs, as mentioned. This also may include the use of any known shaders and other rendering operations. For example, this rendering can be computed quickly using a compute shader or fragment shader, given the parameters of the light field image (elemental image pitch, lenslet pitch, lenslet focal length, etc). The result may be a root EI where each pixel in the root EI has chroma and or luma image data, and may or may not have assigned depth data. The pixel image data of the root EIs may be stored in a memory for both the rendering here and later display to a user. Many different color schemes may be used, but in the current example RGBD is sufficient. These operations also may or may not include anti-aliasing as described above. Hardware acceleration, whether as a GPU, ISP, or other fixed function or shared circuitry, may be used to increase the processing speed at least for triangle-based interpolation during rasterization.

Figure 12:
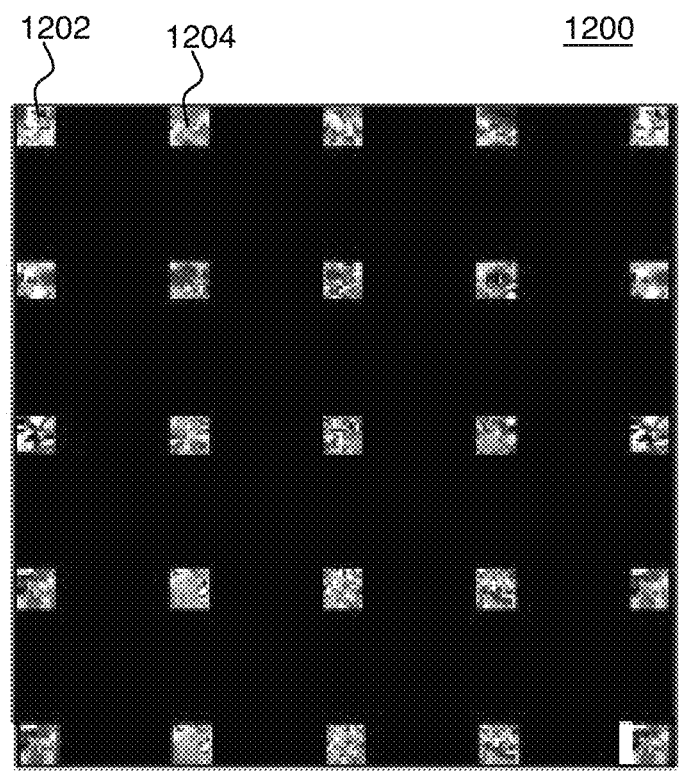
FIG. 12 is an image showing an undersampled integral image with root elemental images according to at least one of the implementations herein.

Referring to FIG. 12, a resulting undersampled integral image 1200 is shown with spaced and rendered root EIs 1202 and 1204 to demonstrate the sparse rendering. The image 1200 is from the viewpoint of the element (or lens) array. The non-root EI locations on the image 1200 may be initiated by setting them to black and very far or infinity depth.

Figure 14A:
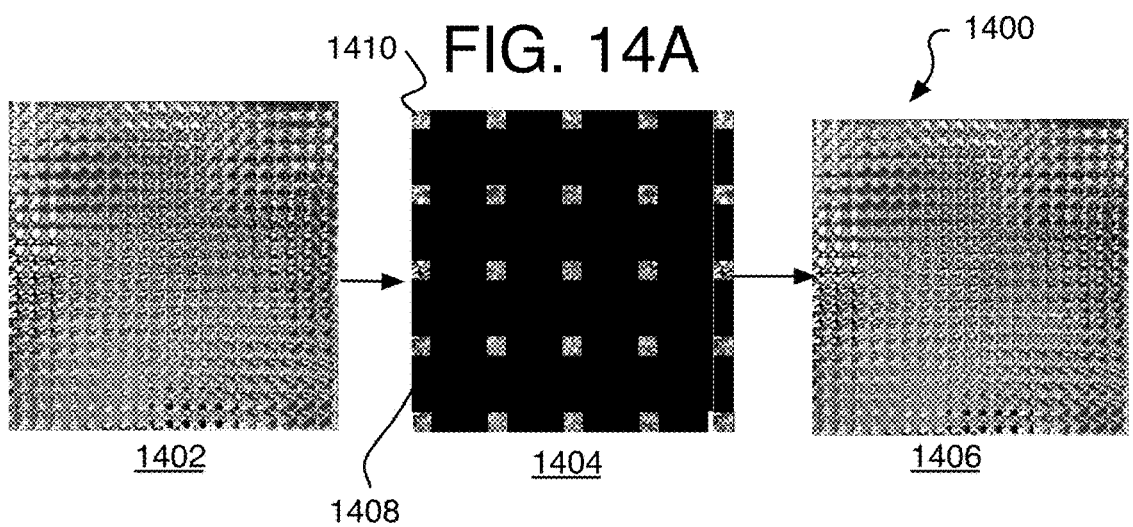
FIG. 14A is an illustration showing a pipeline in images to demonstrate the method of highly efficient image rendering for near-eye light field displays according to at least one of the implementations herein.

Referring to FIG. 14A to place the undersampled image in context, a sequence (or pipeline) 1400 is shown in images to represent the basic flow of process 800 and demonstrate comparable output to conventional methods except here with vastly fewer ray samples. As shown, the image data of a fully rendered (ground truth) integral image 1402 is used to provide input data, such as from a scene model described herein. The data of the fully rendered image (or source data or scene model) 1402 may be used to form the undersampled integral image 1404, similar to undersampled integral image 1200 (FIG. 12). Each rendered root EI 1410 is shown here spaced at 1/16 root EI sample ratio. The black areas 1408 show pixel locations with no image data yet (empty pixels). The black areas 1408 show non-root EI pixel locations with no projected image data yet, referred to as empty pixels even though the pixels may have default values as mentioned. The root EIs 1410 of the undersampled image 1404 is then used for reprojection to generate an initial integral image 1406 that has all EIs generally filled, but still may need in-painting to fill holes or refining.

By the time the root EIs are set, the process 800 may include initializing the individual or all non-root EI pixels to black and to an infinite or far depth, and this may be part of any of the operations shown above. That way the depth-sorting operation follows smoothly as the reprojections unfold so that either the non-root EI pixel locations are filled or maintained as black with a far depth rather than first assigning the defaults. This operation may occur at any time after non-root EI positions are established and before an individual or all non-root EIs are being constructed from the reprojection.

Returning to process 800, the next operation may include "reproject root EIs to form other EIs" 816. Here, each of the pre-rendered root EIs are reprojected in multi-way (or n-way) reprojection where the direction (or angle) is not limited, and in this example into a superblock of nearby non-root or other EIs, when the root EIs are in a superblock-based pattern as with superblock 1102 as shown on FIGS. 11A and 11B. It will be understood that the root EIs may be rendered one by one as the root EIs are used for reprojection, or multiple, or all, root EIs of an integral image or superblock may be rendered before initiating any reprojection into the integral image or the superblock.

Also, the reprojection may proceed pixel by pixel within a root EI as needed. By one form, the present system can handle the reprojection in at least two different ways: a forward-mapped process or pipeline (process 900 of FIGS. 9A-9B) and a reverse-mapped process or pipeline (process 1000 of FIG. 10). Generally, the forward-mapped process 900 reprojects root EI pixel locations to find corresponding non-root EI pixel locations in order to copy the root EI pixel image data to the corresponding non-root EI pixel location. Such a forward implementation, in practice, tends to use triangle rasterization more, and can be very efficient since hardware acceleration is usually available for the rasterization to perform fast interpolation. This assumes the source scene model was provided in a mesh to perform rasterization.

The reverse-mapped process 1000 performs the opposite and selects and projects a non-root EI pixel location to determine a corresponding root EI pixel location. The image data of the root EI is still copied to the empty non-root EI pixel location. However, the reverse-mapped reprojection will not write the image data if the depth value in the image data is not sufficiently close to the ground truth depth. When not satisfied, the non-root pixel location is dropped (turned to, or maintained at, black) and the corresponding root EI pixel location is no longer used, which substantially increases the efficiency of the reverse-mapped reprojection.

Also, the reverse-mapped reprojection may be more accurate than the forward-mapped implementation because the forward-mapped reprojection may reproject to pixel locations outside of a target non-root EI, which occurs because the reprojected position of the point falls outside the non-root frustum and therefore lowers efficiency. The reverse-mapped implementation, however, uses prior knowledge of the depth value at the destination (non-root) pixels in order to perform the mapping as mentioned. Thus, the reverse-mapped implementation may not be available unless a depth map is available for the non-root EIs. More details will be explained below with processes 900 and 1000.

As to the pixel reprojection algorithm itself, this may be the same whether forward or reverse mapped. By one form, the root EI and the target non-root EI both may have projection matrices. Thus, the system merely needs to switch the matrix positions in the projection equation and input and output pixel locations depending on the mapping direction.

For the projection algorithm, the projection matrices are used to determine a destination (or non-root) pixel location from a known source (or root) pixel location on a root EI, or vice versa. In other words, the algorithm provides N-way clustered (superblock) reprojection to perform elemental image—to—elemental image reprojection.

Referring again to FIG. 3, the projection matrices are based on the near-eye display optics setup. Particularly, pp may be set as the lens pitch, which is the distance between the optical axes of different lenslets or elements. Also, the system sets an ep as the elemental image pitch which is the distance between two neighboring elemental images, and S is the spacing between the lens array and the display as already shown on FIG. 3. In the usual near-eye arrangement, ep>pp. This causes the projection matrix to be shifted with respect to the camera origin except for the unusual case where the projection matrix and camera are aligned at the center of the display system. The setup here where S is smaller than the focal length f of the elements (or cameras), virtual-mode images are generated according to optical laws and that can be viewed by a user.

With this arrangement then, projection matrices can be generated for each element, and in turn each individual elemental image. The camera positions may be "virtually" placed at lenslet (element) centers, and the full projection matrix may be used including skew terms (explained below).

Since each EI has its own transformation or projection matrix, a convenient coordinate system should be used to establish a reference orientation for each matrix. By one example, an origin may be set at a center of a lenslet array (XY plane corresponds to a lenslet array plane). The center of the lenslet array may be aligned with a center of the display, separated by spacing S as mentioned. The camera origins are laid out on the lens plane (separated from each other by lenslet pitch pp).

The equation for performing the projection may include the use of simple linear algebra. The general reprojection from camera (or source) A to camera (or destination) B may be represented as:

$$\text{ImgPt}_b = VP_a^{-1} VP_b^* \text{ImgPt}_a \quad (1)$$

where 'a' refers to a source for the projection, 'b' refers to the destination for the projection, $\text{ImgPt}_b$ is the destination pixel location on the non-root EI in forward mapping, $\text{ImgPt}_a$ (or ImagePoint.xyz) is the source 3D pixel location on the root EI in forward mapping, P is a projection matrix that transforms points from camera view space to image space, which also may be referred to as an intrinsic matrix. Also in equation (1), V is a view matrix that transforms points from a global coordinate system into the camera view coordinates, while VP is a compound of the view matrix (V) multiplied by the projection matrix (P). This maps points from the global coordinates into the image coordinates. The variable $(VP_a)^{-1}$ (or InvViewProjMatrixA) is the inverse of the view projection matrix $VP_a$, which maps points from the image space into the global coordinates, and where $VP_a$ is for having the source at the root EI in forward mapping. The compound matrix $VP_b$ (or ViewProjMatrixB) is for the destination or non-root EI in forward mapping. The opposite would be set for reverse mapping.

In the present example arrangement, the camera or element frustum is asymmetric, or in other words, has a sensor-shift or lens-shift, because the frustum is skewed (referring to asymmetric) so as to align with the corresponding elemental image. Thus, one example projection matrix may be as follows and factors a skew:

$$\begin{pmatrix} \frac{2}{r-l} & 0 & 0 & -\frac{r+l}{r-l} \\ 0 & \frac{2}{t-b} & 0 & -\frac{t+b}{t-b} \\ 0 & 0 & \frac{-2}{f-n} & -\frac{f+n}{f-n} \\ 0 & 0 & 0 & 1 \end{pmatrix} \quad (2)$$

where l is left, r is right, t is top and b is bottom, n is near, and f is far to describe the coordinates on a frustum extending from a lenslet here. Such a projection matrix may be obtained from OpenGL, but other variations may be used. The upper half of the far right column represents a skew from linear algebra in order to represent the asymmetric frustums as mentioned above. See http://www.songho.ca/opengl/gl_projectionmatrix.html and https://j santell.com/model-view-projection.

In actuality, since all cameras (elements) are on the same plane, the math can be simplified as follows. For a general case, the system may compute lenslet-relative pixel displacement on the display as:

$$\text{ImgPt}_b = D^* S/Z \quad (3)$$

where $\text{ImgPt}_b$ is the destination pixel location as described above, D (or DeltaLensDist) is $\text{Pos}_b - \text{Pos}_a$, or in other words, the relative distance between source [a] and destination [b] cameras on the element array, S is the spacing from the array of elements to the display plane as mentioned above, and Z (or src.z) is:

$$Z = \text{Sample}(II, \text{ImgPt}_a) \cdot d \quad (4)$$

where Z is the depth value d of the source pixel coordinate (or image data sample) on the source EI (root EI for forward mapping), and where II is the integral image.

Once the destination pixel location is determined, the image data of the already rendered root EI location is copied to the non-root EI pixel location. The direction of the mapping does not matter for the copying of the image data from the root EI and filling of the empty non-root EI pixel location. This copying also includes the depth data as explained below.

Figure 14B:
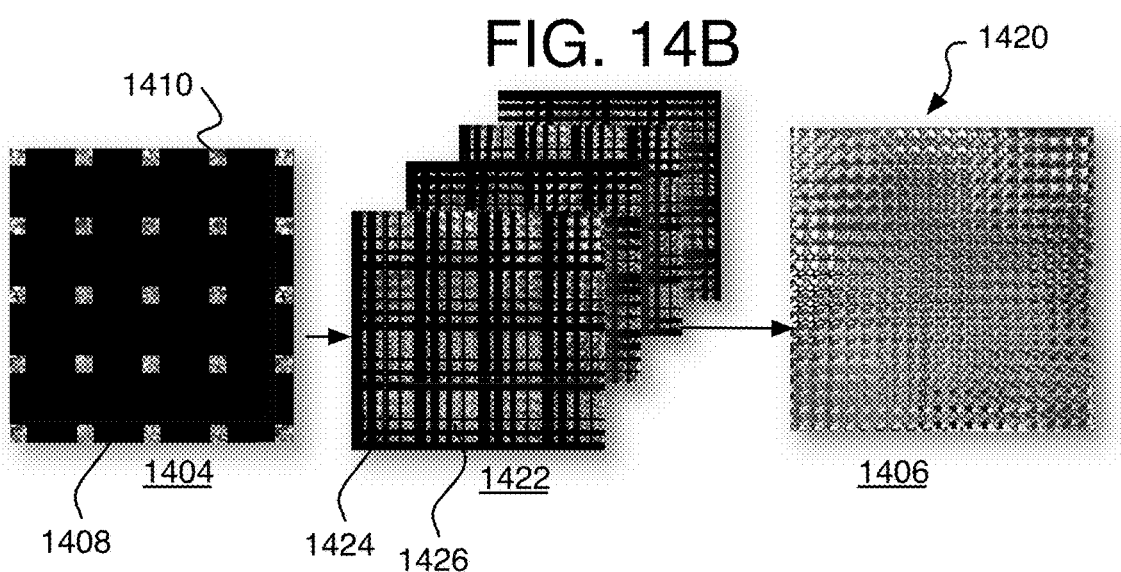
FIG. 14B is an illustration showing another pipeline in images to demonstrate the method of highly efficient image rendering for near-eye light field displays according to at least one of the implementations herein.

Referring to FIG. 14B, the reprojection results are shown on a sequence or pipeline 1420 that represents the reprojection and depth-based merge and threshold operations below. The pipeline 1420 uses the undersampled image 1404 to generate a stack of four reprojected integral image superblocks 1424 shown on image 1422, and where each SB has 4×4 EIs 1426 for a root EI sampling ratio of 1/16. Each SB 1424 has a single different root EI within the SB.

Optionally, process 800 next may include "accumulate EIs" 818, where this refers to collecting all of the rendered EIs and placing them into integral images. This operation also may include combining the jitter iterations when being used, and as the root EIs are being reprojected. This may include a weighted average or summation, or other operation, and this may be performed as iterations are being generated. The result is a single EI for all jitter iterations, and for each non-root EI, and a full initial integral image.

Related to this operation, process 800 then optionally may include the inquiry "last pixel sample generated?" 820. This also may refer to the jitter application option, and may be provided when multiple different pixel samples are being generated for a destination pixel location on a non-root EI. Thus, when the last sample of a last jitter iteration is not reached yet, the process loops back to operation 812 to generate another jitter iteration. When the last jitter iteration has been reached, for whatever level is being used (per-pixel, per-EI, per integral image portion, or per integral image), then the process moves on to the next operations to merge the generated non-root EIs and root EIs.

When all of the EIs of an SB or integral image, or other integral image division are accumulated, the root EIs may be placed on a composite initial integral image surface, or stored in memory in an order or with an indexing to do so. While the EIs are being placed onto the composite image pixel by pixel, this effectively merges the stack of reprojections of the root EIs one-by-one into the composite image, and this may be performed while using depth-sorting operations as follows.

Thus, when the EIs (or SBs) are all formed, process 800 next may include "compare pixel depths to at least one depth criterion" 822. This better ensures the accuracy of the results and limits artifacts.

For forward-mapped reprojection, this operation first may include having process 800 "compare non-root pixel depth to root pixel depth criterion" 824. Here, the depth of a first reprojection (non-root EI pixel) is placed on the integral image. Thereafter, each subsequent non-root EI pixel depth is compared to the existing depth of the non-root EI pixel already merged onto the integral image before it and that received corresponding root EI depth data. If the current destination (non-root) pixel depth is substantially less than the existing destination pixel depth of a different previous non-root EI pixel, such as less than 95% of the existing pixel depth as a threshold, then the system overwrites the existing pixel depth value to match the depth value of the latest or current pixel. When the process is complete, the integral image may appear mostly complete. However, the integral image will still have disocclusion artifacts and gaps from the original sampling and reprojection pattern.

As a secondary optional depth-related threshold for both reverse and forward-mapped reprojection, process 800 may include "compare non-root pixel depth to ground truth" 826, and while the pixel data is being placed onto the composite initial integral image as well. Here, if a full-image depth channel is provided such as in the form of a Z-buffer, then reprojected pixel depth values are compared to the input (or ground truth) depth of the non-root EI pixels as well. If a mismatch in depth exists between the reprojected and ground truth depths, and by at least a threshold which may be determined by experimentation, then the sample image data from the root EI is discarded for this non-root pixel location, and the non-root pixel location is maintained at black (or other hole-indicating color) and with a far or infinity depth. This may occur, for example, if anti-aliased input is reprojected.

When this operation is being performed for reverse-mapped reprojection, then the corresponding root EI pixel location that provided the erroneous depth value will no longer be used in any of the reprojection computations.

Figure 14C:
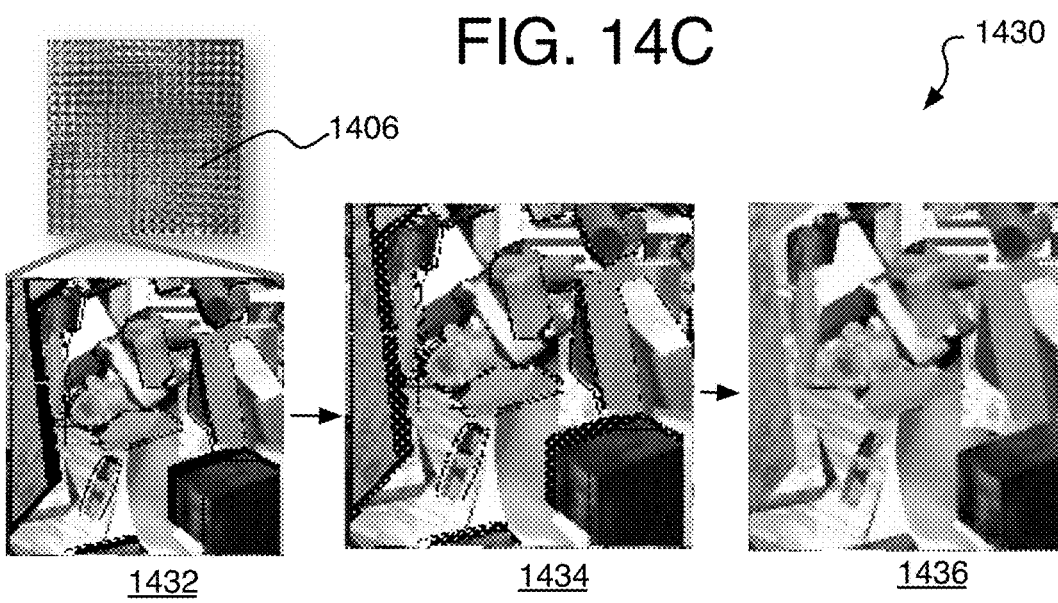
FIG. 14C is an illustration showing a further pipeline in images to demonstrate the method of highly efficient image rendering for near-eye light field displays according to at least one of the implementations herein.

Referring again to FIG. 14B, the results of the reprojection, including the depth-based merging and filtering mentioned above, is an initial integral image 1406. On much closer examination, the image at this point is usually incomplete due to gaps and disocclusions. Referring to FIG. 14C, a sequence or pipeline 1430 represents the post-processing correction and in-painting operations (where post-processing here is relative to the reprojection itself). The initial integral image 1406 is shown here with disocclusions and gap artifacts on a close-up elemental image 1432 of the integral image 1406. Thus, further re-sampling and neural network (NN) reconstruction may be used beyond this point to improve the integral image.

Here, process 800 optionally may include "repeat reprojection at holes or distorted image data" 828, and in order to perform sparse re-sampling. This involves repeating the reprojection for an empty (or black) pixel location in a hole on a non-root EI in order to further fill holes on the initial integral image with new samples. This post superblock processing operation reduces the number of pixels that need to be in-painted and seeks to minimize the complexity of the reconstruction NN employed to in-paint and reconstruct the final result while reducing the NN's need to hallucinate results, and in turn reducing the size of the NN's receptive field.

This may be performed by sparsely re-rendering pixels in areas that remain unfilled. In one example, this is performed by using a uniform or fixed regular $\frac{1}{8}^{th}$ grid of new samples (one pixel re-sampled for every 8 pixels). It will be understood, however, that the re-sampling ratio may be other values, and may be adaptive to change depending on a variety of factors such as image content complexity, depth variation, temporal combinations of any of these indicators, and so forth. By yet another form, sample locations may also be determined by an artificial intelligence (AI) such as a DNN or machine learning model that infers heuristically where to place samples.

Process 800 may include "reconstruct the integral image using a neural network" 830 in order to perform in-painting to remove further artifacts from the initial integral image and refine the image data. Thus, the NN may act to reduce hole sizes with missing image data that is seen so far as black, and may fill the holes by interpolation methods with surrounding image data. Other pixel data that is clearly wrong, such as an outlier pixel color in the middle of a field of a different pixel color, may simply be replaced.

Here, a deep neural network to perform the in-painting is trained to reconstruct the initial integral image generated by using the reprojection of root EIs, and when performed, already re-sampled pixel image data. The conventional machine learning processes typically use expensive, overly sophisticated, and complex multi-stage coarse-to-fine deep neural network (DNN) architectures and/or generative adversarial network (GAN) training with multiple stacked auto-encoders, enlarged receptive fields (via large kernels, larger and many layers, dilations, etc.) such as parallel extended-decoder path for semantic in-painting (PEPSI). These can be used, but the reconstruction NN described below is much more efficient.

Figure 15:
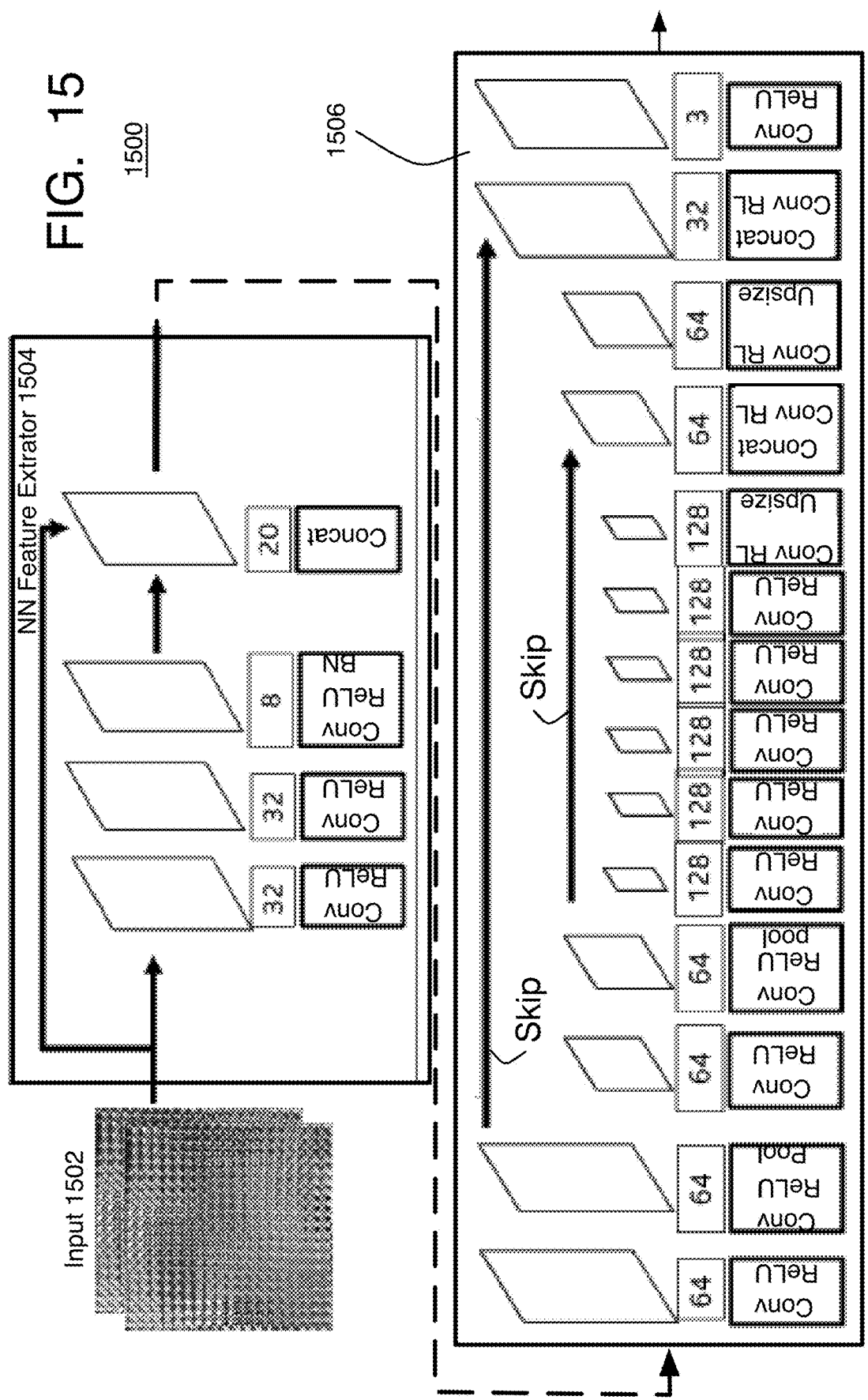
FIG. 15 is a schematic diagram of an example neural network to process near-eye display images according to at least one of the implementations herein.

Thus instead, and while referring to FIG. 15, the present process 800 uses a less expensive and/or less sophisticated DNN method. An example NN 1500 uses a simple modified UNET architecture and is a three-scale variation of UNET with a dilated convolution preceded by a feature extraction stage. The example NN 1500 is used to perform in-painting (including any artifact removal) that receives input 1502 that may include image data of an initial integral image so far plus a depth map if not provided with the integral image data itself. By one example, the input is in the form of 512×512×5 patches including RGBD pixel image data plus a ground truth depth (z) map. The input 1502 is provided to a NN feature extractor 1504 which then provides features to a main in-painting NN sequence 1506. The feature extractor 1504 may have a sequence of convolutional and rectilinear unit (ReLU) layers (labeled as Cony ReLU) before a concatenation (concat) layer. The number of channels are shown above each layer.

The main NN sequence 1506 also has a sequence of Cony ReLU layers, but also with a pooling layer (Cony ReLU Pool), and some alternating upsampling or upsizing layers with convolution and the ReLU (shown as Cony RL Upsize). Near the end of the sequence, alternating concatenation with convolution and ReLU (Concat Cony RL) layers also may be provided. Again the number of channels is provided above each layer. The main NN 1506 in this example, and along propagation from input to output of the main NN 1506, the main NN 1506 may receive 512×512 input channels (or surface size), then a first pooling layer reduces the channels to 256×256, and a second pooling layer reduces the channels to 128×128, a first upsize layer converts the channels to 256×256, and a second upsize layer converts the channels to 512×512 which is maintained for the output. Many variations exist and can be determined with experimentation.

Referring again to FIG. 14C, a resulting elemental image 1434 shows the results of sparse re-sampling, where every $8^{th}$ pixel ($⅛^{th}$ re-sampling ratio) is re-sampled as described. It can be seen that the artifacts are smaller but still present. A resulting elemental image 1436 shows the final integral image after NN reconstruction has reduced or eliminated the artifacts.

Figure 13:
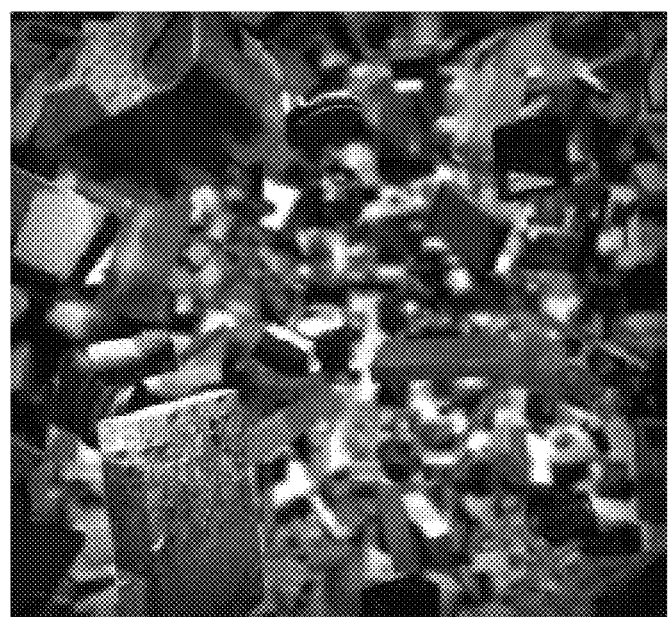
FIG. 13 is an image of an example resulting integral image according to at least one of the implementations herein.

Referring to FIG. 13, another resulting integral image 1300 output from the reconstruction NN may be generated by using the process 800 described above and to be displayed to a user.

Figure 9A:
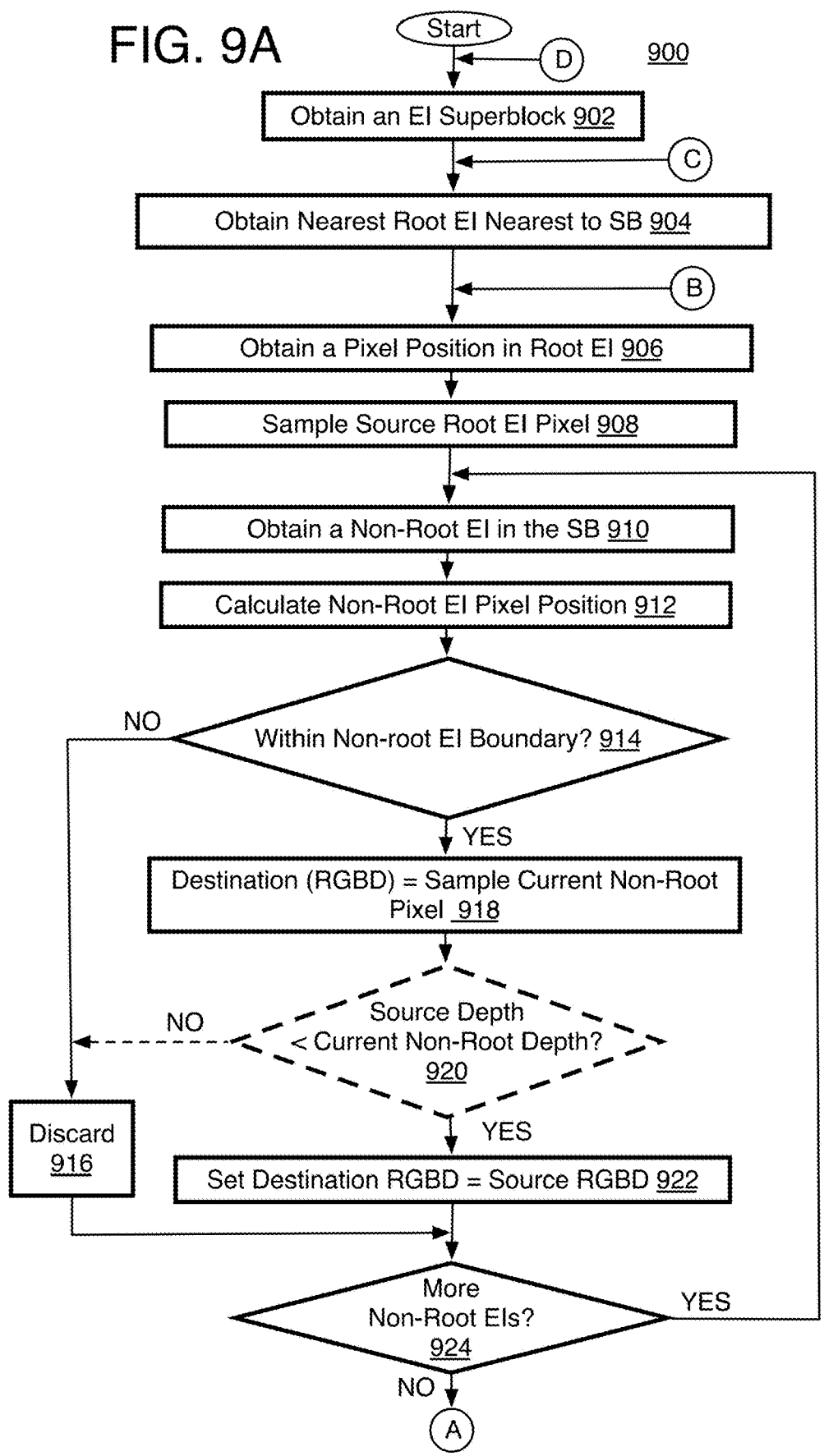
FIGS. 9A-9B is a detailed flow chart of another example method of highly efficient image rendering for near-eye light field displays according to at least one of the implementations herein.
Figure 9B:
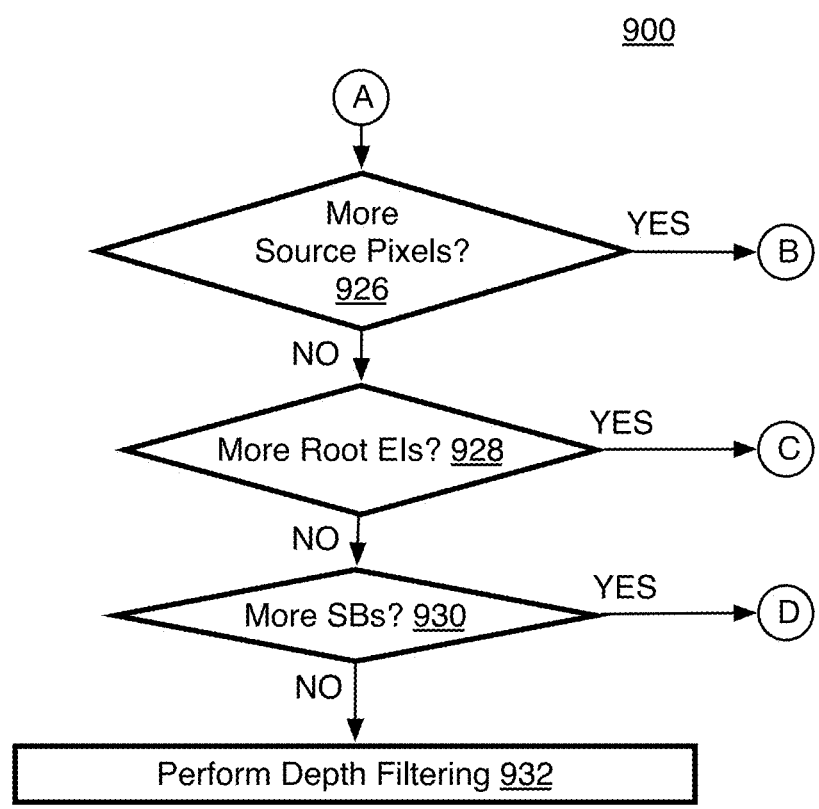

Referring now to FIGS. 9A-9B, an example process 900 is a computer-implemented method of highly efficient image rendering for near-eye light field displays, and particularly by forward-mapped reprojection. In the illustrated implementation, process 900 may include one or more operations, functions or actions as illustrated by one or more of operations 902 to 932 numbered evenly. By way of non-limiting example, process 900 may be described herein with reference to example image processing systems 600 and 1800 of FIGS. 6 and 18 respectively, and where relevant.

The forward-based mapped reprojection does not require depth values or anti-aliased depths, although the depth analysis can better ensure accuracy, and at least by using coarse depth during filtering as described above with process 800. The forward mapped reprojection process 900 can take full advantage of rasterization by hardware accelerators as mentioned above.

Process 900 may include "obtain an EI superblock" 902, and as mentioned above where a single SB may be 3×3 to 6×6 EIs although other sizes may be used as well. The system may select an SB as a current SB to have non-root EIs generated within the current SB.

Process 900 may include "obtain nearest root EI nearest to SB" 904, where a root EI either within the current SB is selected or a root EI closest to the current SB is selected such as along the edge of the current SB as in FIG. 11A. By one form, a corner root EI is selected that occupies a corner EI within the current SB or is adjacent a corner of the current SB.

Process 900 may include "obtain a pixel position in root EI" 906, where a pixel position to project is selected as a current source root EI pixel (or current root EI pixel location). This may be performed in any order such as raster order starting with the upper-left pixel position within the root EI.

Process 900 may include "sample source root EI pixel" 908, and this refers to obtaining the image data of the current pixel, such as the RGB or RGBD image data when so provided. Thus, the pixel location may already be associated with a depth. Such depth may be stored with the other pixel image data channels, or may be on a separate depth map, such as a ground truth depth map (or Z-buffer) that shows input or scene model depth values.

Process 900 may include "obtain a non-root EI in the SB" 910, where, by one approach, a target non-root EI is selected to be filled with the reprojected image data from the selected root EI. This may be in any order, and as long as the non-root EI is closer to the selected root EI than any other root EI (or is the same distance from another root EI). By other alternatives, the distances do not matter when multiple root EIs project to the same non-root EI (and the results are to be combined).

Process 900 may include "calculate non-root EI pixel position" 912, and relative to the current root EI pixel position for forward mapping. This reprojection operation may be based on projection matrices and as described above with process 800.

Process 900 may include the inquiry "within non-root EI Boundary?" 914. Here, a check is made as to whether the corresponding non-root EI pixel location is actually within the target non-root EI (similar to a clipping operation to remove outliers). As mentioned, this check may be helpful because the reprojected position of a point in the root EI may fall outside the view frustum of the non-root EI. This is typically caused when that point is close to the camera and thus experiences large motion parallax between viewpoints.

When the corresponding non-root EI pixel location is outside of the target non-root EI, process 900 may include "discard" 916, and referring to discarding of the pixel location by turning (or maintaining) the pixel location as black and with a depth of very far or infinity, and discarded to analyze a next pixel location. The process 900 then checks to see if more non-root EIs exist 924 that may have a pixel that corresponds to the same source root EI pixel just used for the current non-root EI. If so, the process loops back to operation 910 to process the next destination (non-root) EI. If not, the process continues with checking for available source (root EI) pixels described below.

Returning to operation 914, if the non-root pixel location is within the current non-root EI boundary, then process 900 may include "destination (RGBD)=sample current non-root pixel" 918 where the destination pixel location (or destRGBD) image data from the root EI is then obtained and provided as potential sample current destination (non-root) pixel image data. The image data may or may not include depth values, or as mentioned, depth values may be provided from a separate depth map.

When default depth values and color are provided to the destination non-root pixel location, such as the initial "very far" or infinity depths and black mentioned above (see operation 814), process 900 optionally may include "source depth<current non-root depth?" 920. Here, the source depth is the root EI pixel depth. This threshold is used because the non-root depth may not be known in advance. If it is known in advance (and the default does not need to be used), the system can switch to assigning the image data of the root EI to the non-root EI when the depth of the two EIs match.

But here when the depth is not known, and if the source depth is not less than the current non-root EI pixel depth, then the non-root EI pixel is dropped, and the existing default non-root pixel value and color black (or other color) is maintained.

If the source root EI pixel depth is less than the non-root EI destination pixel depth, process 900 may include "set destination RGBD=source RGBD" 922. Here, the root EI pixel image data is then copied to the corresponding non-root EI pixel location (or overwrites the default values already present in memory). It should be noted that these depth operations may be in addition to the subsequent depth-sorting merge and filter operations described above with process 800.

Process 900 then continues to analyze all other integral image divisions. Thus for example, next process 900 may include the inquiry "more non-root EIs?" 924, where the same source root EI pixel is used to correspond to a pixel in each available non-root EI, and being the ones closest to the current root EI by the example herein. When another near non-root EI is available, the process loops to operation 910 as mentioned above.

When no more non-root EIs exist for the current root EI pixel, process 900 may include the inquiry "more source pixels?" 926, where the process loops to operation 906 and the data of a next source pixel in the current root EI is obtained. The process above is then repeated for this next source pixel, and so on until all source root EI pixels of the current root EI are matched to a destination non-root pixel in each available non root EI.

After the last non-root EI for a current root EI is analyzed, process 900 may include the inquiry "more root EIs?" 928, where the process loops back to operation 904 to obtain a next nearest root EI and the process may be repeated for the next root EI.

Once the last root EI of an SB is analyzed, process 900 then may include the inquiry "more SBs?" 930 to continue with analyzing the next SB at operation 902.

Once the last SB is analyzed, this competes the projection, and process 900 may include the inquiry "perform depth filtering" 932, and generally referring to the depth merging and depth filtering when being performed, and as described on process 800.

It will be appreciated this is one possible forward-mapping reprojection process, and many variations can be used with sparse sampling of root EIs.

Figure 10:
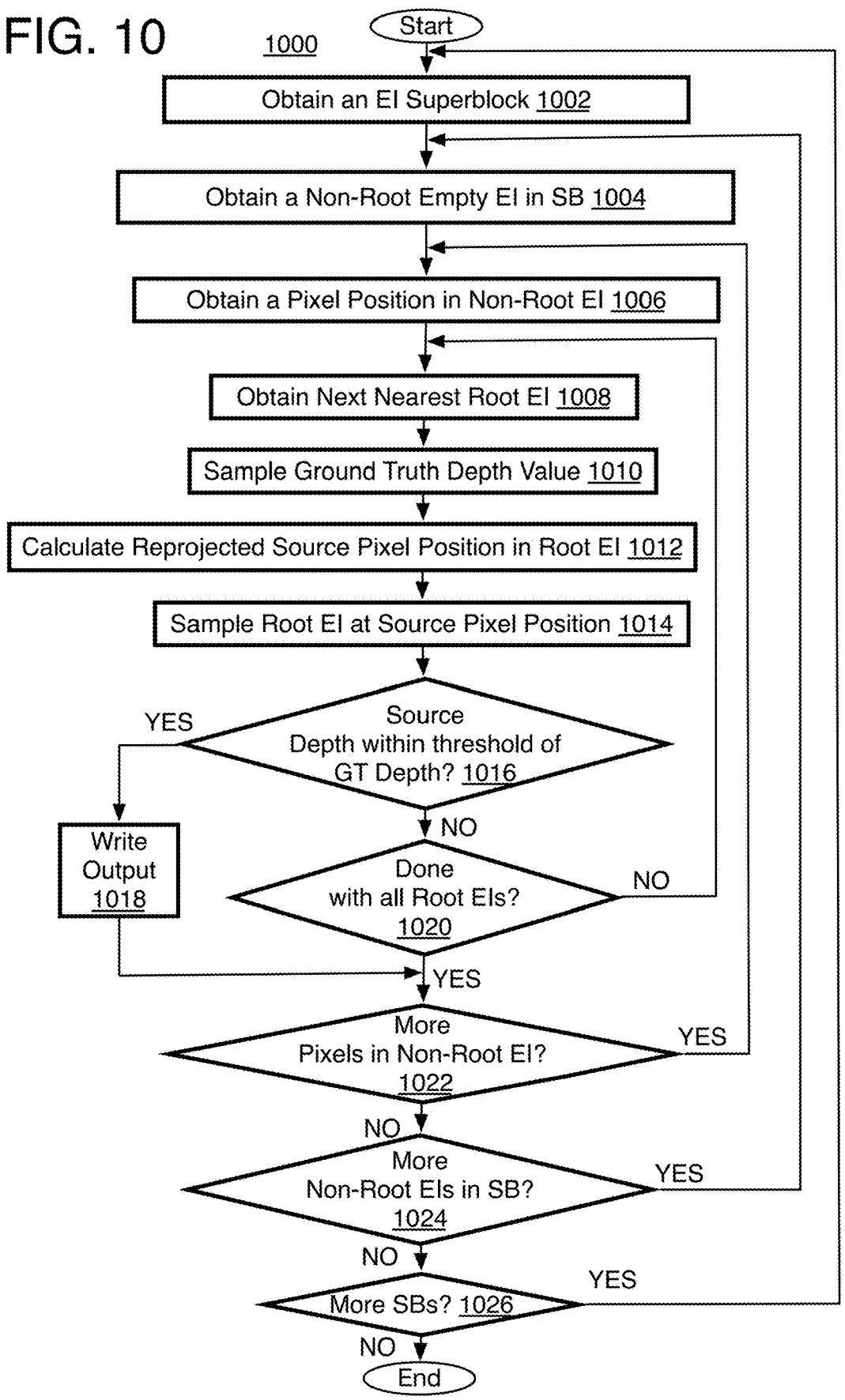
FIG. 10 is a detailed flow chart of yet another example method of highly efficient image rendering for near-eye light field displays according to at least one of the implementations herein.

Referring to FIG. 10, an example process 1000 is a computer-implemented method of highly efficient image rendering for near-eye light field displays, and particularly to perform reverse-mapped reprojection. In the illustrated implementation, process 1000 may include one or more operations, functions or actions as illustrated by one or more of operations 1002 to 1026 numbered evenly. By way of non-limiting example, process 1000 may be described herein with reference to example image processing systems 600 and 1800 of FIGS. 6 and 18 respectively, and where relevant.

The reverse-mapped gather-based variation can be more efficient and faster than the forward-mapped process. The reverse-mapped process, however, uses pre-rendered ground-truth depth data for the non-root EI pixel locations. For each destination (non-root) EI pixel being calculated, the process for searching for a corresponding root EI pixel location terminates for a current non-root EI pixel location early if the ground truth depth sufficiently matches the root EI pixel depth value or the maximum number of iterations of root EI matches is attempted for a non-root EI pixel location. This early termination substantially reduces computational load. Note that the term destination EI is still referred to as non-root EI and source EI still refers to root EI because the image data will be copied form the root EI to the non-root EI even though the direction of projection has switched from that in the forward-mapped reprojection. Process 1000 proceeds as follows.

Process 1000 may include "obtain an EI superblock" 1002, and as described with operation 902. Once an SB is selected, process 1000 may include "obtain a non-root empty EI in SB" 1004. The selection of the non-root EI may be in any order, such as raster order within the selected SB.

Process 1000 next may include "obtain a pixel position in non-root EI" 1006, where a non-root EI pixel location is selected to be filled with image data copied from a root (source) EI pixel. The non-root EI pixels may be selected in any logical or efficient order, such as raster order starting with an upper left corner pixel location of a current non-root EI.

Process 1000 may include "obtain next nearest root EI" 1008, where the root EI closest to the current non-root EI with the current non-root EI pixel location is selected. This may be a root EI within the current SB or a root EI near the current SB, such as near one of the corners of the current SB according to the example SB and root EI patterns described herein.

Process 1000 may include "sample ground truth depth value" 1010, which refers to obtaining the predetermined ground truth depth value (or input depth value) from a depth map (or Z-buffer) described above and for the current non-root EI pixel location.

Process 1000 may include "calculate reprojected source pixel position in root EI" 1012. Here, the projection matrices as described above with process 800 or other projection techniques may be used to compute a root EI pixel location on the selected root EI that corresponds to the current non-root EI pixel location.

Process 1000 may include "sample root EI at source pixel position" 1014, which involves obtaining the pixel image data, such as the RGBD data, of the computed source root EI pixel location determined by reverse projection.

Process 1000 may include the inquiry "source depth within threshold of GT depth?" 1016. Here, the depth value in the image data of the source root EI pixel location is compared to the ground truth depth value of the destination. If the source depth is within the threshold, such as a threshold of 1% error, then process 1000 may include "write output" 1018 where the image data of the root EI pixel is copied to the non-root EI pixel. The threshold may be determined by experimentation. The processing for the current non-root EI pixel location is then complete, and the process moves to the next non-root EI pixel location as described below. Both the matching root and non-root EI pixel locations here then may not be used for any further computations for the current non-root EI.

If the depths have a difference greater than the threshold, the system then attempts to match non-root EI pixel location to a different root EI as explained below. Thus, when the depths are different, process 1000 may include the inquiry "done with all root EIs?" 1020, where the method checks to see if matches have already been attempted between the current non-root EI pixel and all of the root EIs available to the current non-root EI. By one example, the root EIs available may be only those that are within or adjacent to the current SB being analyzed. Many other variations could be used instead though. If more root EIs exist, the process 1000 loops back to operation 1008 to obtain a next nearest root EI that is available for this current non-root EI. The process 1000 then continues to try to match the current non-root EI to the new root EI. This is repeated for the single current non-root EI pixel for all available root EIs.

If no more root EIs are available (all iterations are done for the current non-root EI), then the current non-root EI is dropped, kept or maintained as the default black with very far or infinity depth. Process 1000 then proceeds to determine if there are more non-root EI pixel locations in the current non-root EI to analyze. Thus, process 1000 may include the inquiry "more pixels in non-root EI?" 1022, and in the current non-root EI. If so, the process loops back to operation 1006 to select a next empty non-root EI pixel location in the current non-root EI, and the process proceeds as mentioned above for multiple root EIs for the next non-root EI pixel.

If the current non-root EI does not have more empty non-root EI pixel locations to be analyzed, process 1000 may include the inquiry "more non-root EIs in SB?" 1024. If the current SB has more non-root EIs, the process loops back to operation 1004 to analyze the next non-root EI using the reverse-mapped operations described above.

If the current SB does not have more non-root EIs to analyze, then process 1000 may include the inquiry "more SBs?" 1026. If more SBs are present in the integral image, then the process 1000 loops back to operation 1002 to start analysis of the next SB. If no other SBs are present, then the process here ends and continues with the post-processing optional re-sampling and/or NN reconstruction in-painting of process 800. The forward-mapped operations of depth-sorting merge and filtering (operation 822) are skipped as being largely redundant to the reverse-mapped depth operations.

Experimental Results

The present method and system achieves upwards of 90% reduction in pixel-wise rendering costs with low artifacts in typical scenarios.

Referring to FIGS. 16A-16F, a set of elemental images show a variety of results with and without re-sampling, and with and without a full depth map being used. A top row of images 1600, 1602, and 1604 show results without re-sampling, while the bottom row of images 1606, 1608, and 1610 show results with sparse re-sampling as described herein. The first column of images 1600 and 1606 are the initial integral images input to an in-painting reconstruction NN and has visible holes shown as black. The second column of images 1604 and 1608 show results by using a full depth map during the reprojection process and as input to the reconstruction NN. The third or right column shows output images 1604 and 1610 when no full depth map was used in either the reprojection process and as input to the reconstruction NN. It can be seen in the circles that the best resulting image used re-sampling and had the full depth map input to the NN at elemental image 1608.

Referring to FIGS. 17A and 17B, an example refocus test using the present method algorithm pipeline was placed into a near-eye light field display simulator to show what a human eye would see when observing both the reconstructed image (from the pipeline) as well as the ground truth image. One effect of near-eye displays is that artifacts tend to occur along occlusion boundaries, and it is these boundaries which naturally experience defocus blur as the human eye focuses through a scene. Because of this (and the small (2-8 mm) disparity), artifacts are much more tolerable than approaches seen for far eye light field and multi-view displays.

For example, image 1700 is a ground truth image while image 1702 is a resulting output integral image where little or no difference can be seen between the two images. This was obtained by performing reverse-mapped reprojection with re-sampling.

It will be appreciated that the processes 700, 800, 900, and 1000 respectively explained with FIGS. 7-10 do not necessarily need to be performed in the order shown, nor with all of the operations shown. It will be understood that some operations may be skipped or performed in different orders.

In addition, any one or more of the operations of the processes in FIGS. 7-10 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 18:
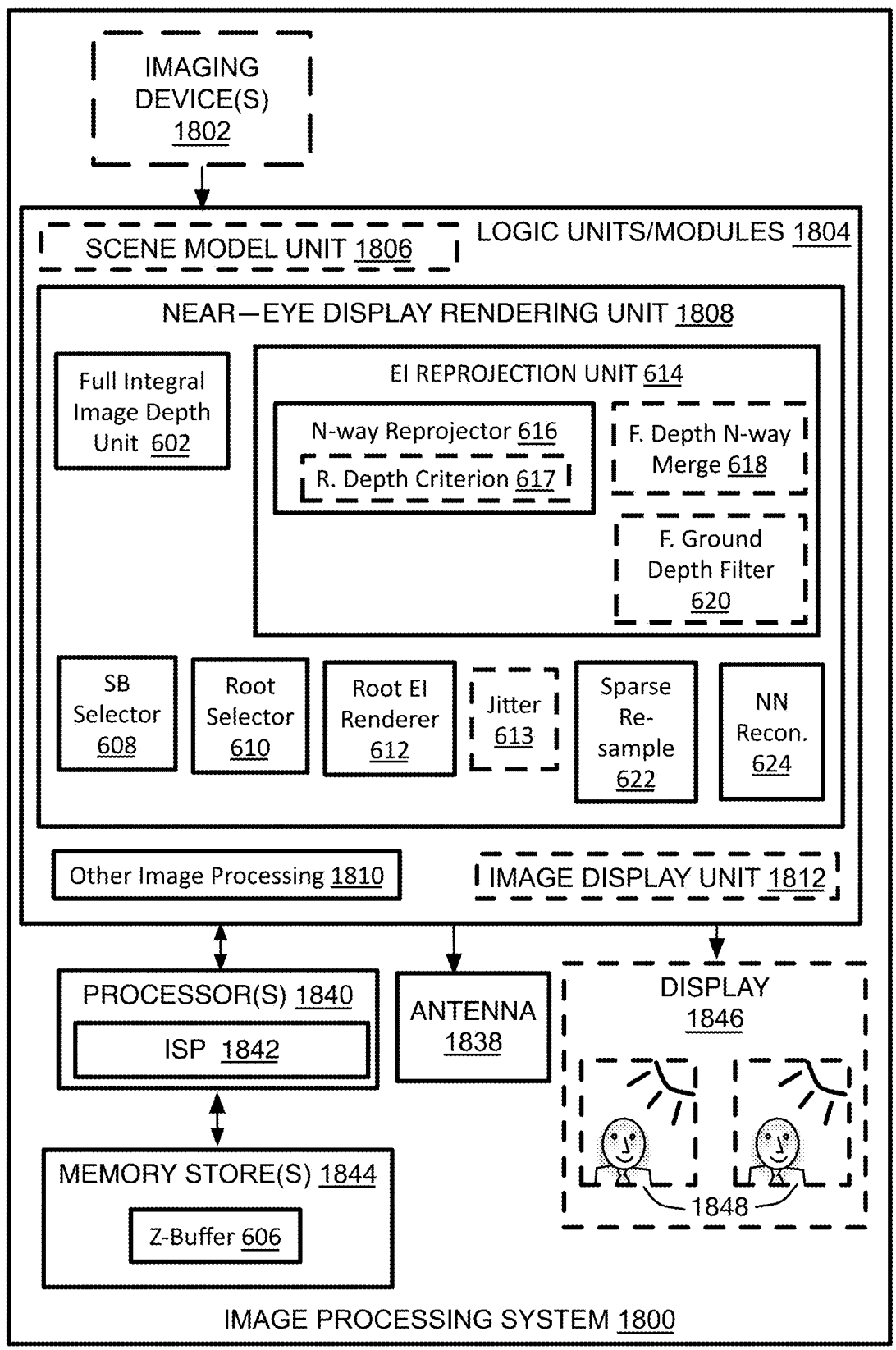
FIG. 18 is a schematic diagram of an example system.

Referring to FIG. 18, an example image processing system 1800 is arranged in accordance with at least some implementations of the present disclosure. In various implementations, the example image processing system 1800 may perform many of the functions of near-eye display rendering described above. Thus, system 1800 may be an HMD arranged to display the near-eye integral images described herein, a separate base or other mobile device, computer, network, or system wirelessly communicating with the HMD, or both (where one system 1800 may be the HMD and another system 1800 may be a device or computer providing performing the rendering processing). When the system 1800 is the HMD, the system 1800 has at least those units shown to receive image data or scene model data. Thus, in addition to the HMD, the system 1800 may be a multi-function device such as a smartphone, smart glasses, tablet, and so forth.

When the system 1800 is remote from the HMD, the system 1800 has at least those units shown for transmitting image data or scene model data to an HMD. In these cases, the system 1800, or at least the part of the image processing system 1800 that holds logic units 1804 that performs near-eye display rendering computations, may be an HMD base, a desktop or laptop computer, smartphone, tablet, server, computer network, or other device. The system 1800 also could be, or have, a fixed function device such as a set top box (cable box or satellite box), game console, or a television.

Otherwise, the system 1800 may be one or more imaging device(s), such as cameras, 1802 to provide captured images for augmented reality (AR) for example, or the system 1800 may be considered to have the imaging device(s) 1802. In any of these cases, such technology may include a camera such as a digital camera system, a dedicated camera device, web cam, or any other device with a camera to be an external still or video camera capturing the user wearing the mobile device and the area around the user for example, or capturing the environment surrounding the mobile device when such a camera is on the mobile device. The camera may be an RGB camera or an RGBD camera, but could be a YUV camera. An internal camera on device of system 1800 may be an RGB or YUV color camera, monochrome camera, or an IR camera with a projector and sensor. Thus, in one form, image processing system 1800 may include the imaging device(s) 1802 and that has camera hardware, camera software, units, modules, components, and optics including one or more sensors as well as auto-focus, zoom, aperture, ND-filter, auto-exposure, flash, actuator controls, and so forth. In other cases, the imaging device(s) 1802 may be considered physically remote from the rest of the image processing system 1800, and may be wirelessly communicating, or wired to communicate, image data to the logic units 1804. In this form, logic modules 1804 may communicate remotely with, or otherwise may be communicatively coupled to, the imaging device 1802 for further processing of the image data.

The logic modules 1804 of the image processing system 1800 may have a scene model unit 1806 that may include all applications needed to generate a 3D model or provide image data of a 3D model including chroma, luma, and/or depth data as needed. This may include stereo or other applications that convert 2D images to 3D when AR is being used or to generate 3D synthetic or animated images from computer graphics programs. Such data may be used by many different applications including the near-eye display rendering. A near-eye display rendering unit 1808 has a full integral image depth unit 602, an SB selector unit 608, a root selector unit 610, a root EI renderer unit 612, an optional jitter unit 613, an EI reprojection unit 614, a sparse re-sample unit 622, and a NN reconstruction unit 624. The EI reprojection unit 614 may have a N-way reprojector unit 616 with an optional reverse depth criterion unit 617, an optional forward depth N-way merge unit 618, and a forward ground depth filter unit 620. All of these units of the near-eye display rendering unit 1808 are already described above with system or device 600 (FIG. 6).

The logic modules 1804 also may include other image processing applications 1810 that perform any other desired image processing such as object recognition, automatic or user controlled image enhancements, and so forth.

An image display unit 1812 controls the display of the images on the near-eye display or HMD. Thus, the image display unit 1812 may perform pre-processing, decoding, encoding, and/or even post-processing to prepare the image data for transmission, storage, and/or display on near-eye display 1846.

These units may be operated by, or even entirely or partially located at, processor circuitry forming one or more processor(s) 1840, and which may include an image signal processor (ISP) 1842 to perform many of the operations mentioned herein. The image signal processor (ISP) 1842 may be an Intel Atom by one example. The system 1800 also may have memory stores 1844 which may be RAM, DRAM, DDR RAM, cache, or other memory types, and which may or may not hold the image data and depth Z-buffer 606 as well as the logic units mentioned above. The system 1800 also may have at least one antenna 1838, and one or more antennas may be provided whether the system 1800 is a mobile device, a base, or other device mentioned above. The antenna 1838 may be used to transmit and/or receive image data, or overhead data, or other data.

In one example implementation, the image processing system 1800 may have the display 1846, which may or may not be one or more displays on the HMD. The display 1846 may be a binocular display showing two integral left and right images 1848. At least one of the processor(s) 1840 may be communicatively coupled to the display and at least one memory 1844 communicatively may be coupled to the processor to perform the operations described herein as explained above. The image display unit 1812, which may have an encoder and decoder, and antenna 1838 may be provided to transmit compressed image date to and from other devices that may display or store the images. This may refer to transmission of image data between the base and the HMD no matter which of the devices has the logic units 1804. Otherwise, the processed images 1848 may be displayed on the display 1846 or stored in memory 1844 as mentioned.

As illustrated, any of these components may be capable of communication with one another and/or communication with portions of logic modules 1804, display 1846, and/or imaging device 1802. Thus, processors 1840 may be communicatively coupled to both the display 1846 and the logic modules 1804 for operating those components. By one approach, although image processing system 1800, as shown in FIG. 18, may include one particular set of unit or actions associated with particular components or modules, these units or actions may be associated with different components or modules than the particular component or module illustrated here.

Figure 19:
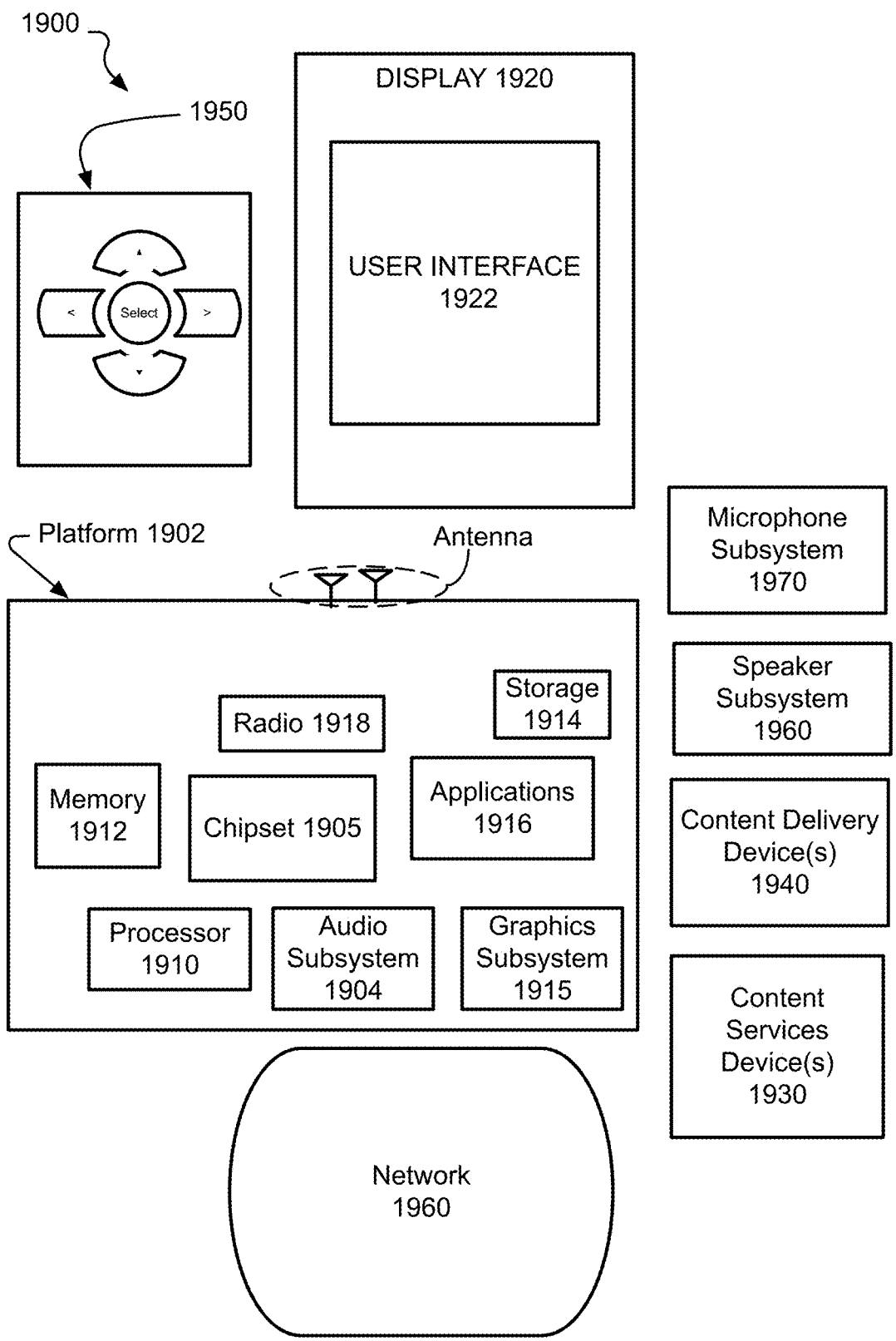
FIG. 19 is an illustrative diagram of another example system.

Referring to FIG. 19, an example system 1900 in accordance with the present disclosure operates one or more aspects of the image processing system described herein. It will be understood from the nature of the system components described below that such components may be associated with, or used to operate, certain part or parts of the image processing systems described above including performance of a mobile device such as an HMD or other mobile device with a near-eye light projecting display for virtual or augmented reality generation for example, and/or operation of the base described above. In various implementations, system 1900 may be a media system although system 1900 is not limited to this context. For example, system 1900 may be incorporated into a digital video camera, mobile device with camera or video functions such as an imaging phone, webcam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, storage 1914, graphics subsystem 1915, applications 1916 and/or radio 1918. Chipset 1905 may provide intercommunication among processor 1910, memory 1912, storage 1914, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU), image signal processor (ISP), or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1910 or chipset 1905. In some implementations, graphics subsystem 1915 may be a stand-alone card communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), personal area networks (PANs), cellular networks, and satellite networks. In communicating across such networks, radio 1918 may operate in accordance with one or more applicable standards in any version, and may be operated in conjunction with the antenna described below.

In various implementations, display 1920 may include any type of display that can provide near-eye displays. Display 1920 may be digital and/or analog. The display 1920 also may be a display on an HMD as described above. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of unidirectionally or bidirectionally communicating content between content providers and platform 1902 and/display 1920, via network 1960 or directly. It will be appreciated that the content may be communicated unidirectionally and/or bidirectionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of controller 1950 may be used to interact with user interface 1922, for example. In implementations, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In implementations, controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various implementations, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various implementations, system 1900 may be implemented as a wireless system, but also may include wired systems. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
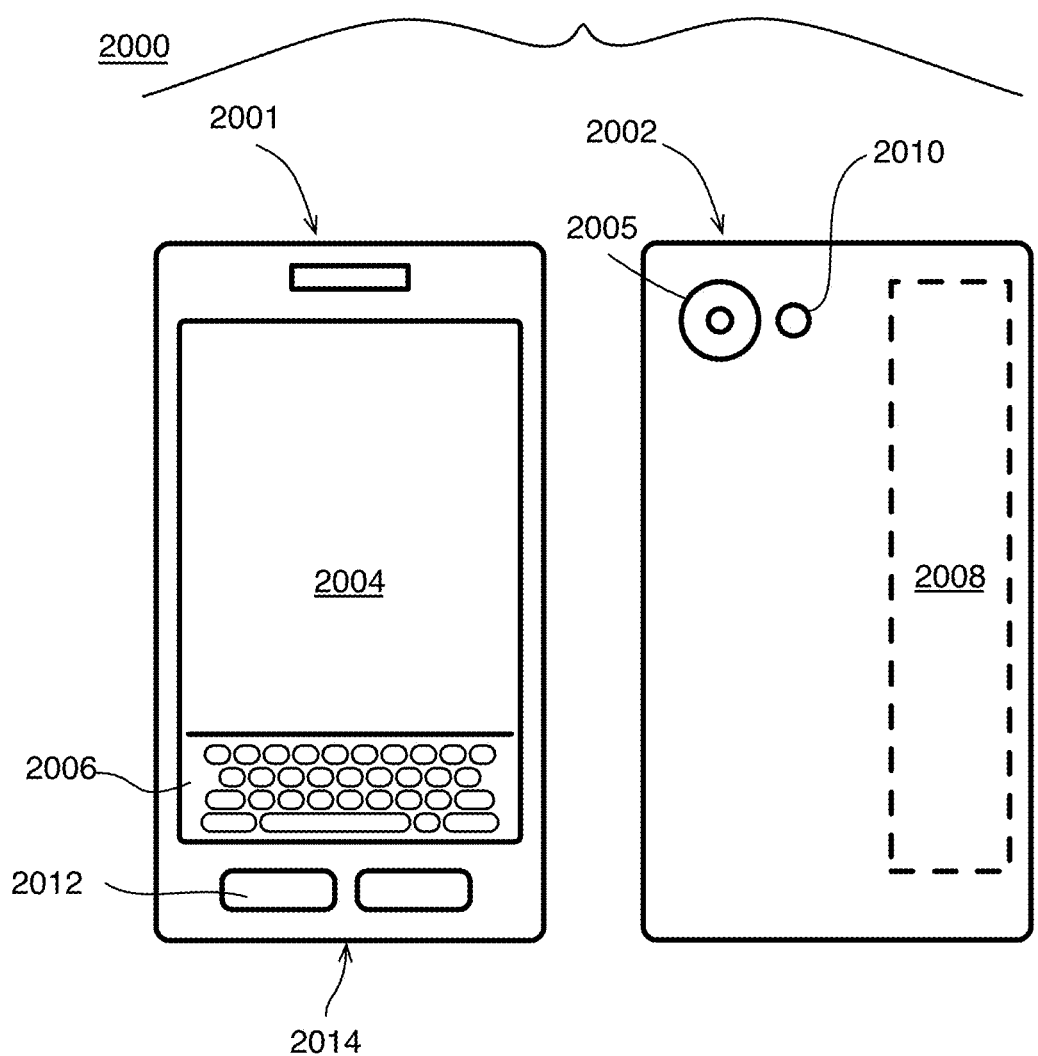
FIG. 20 illustrates another example device, all arranged in accordance with at least some implementations of the present disclosure.

Referring to FIG. 20, a small form factor device 2000 is one example of the varying physical styles or form factors in which systems 1800 or 1900 may be embodied. By this approach, device 2000 may be implemented as a mobile computing device having wireless capabilities, and by one example, could be remotely connected to the a near-eye light projecting display device, such as an HMD. A mobile computing device may refer to any device having a processing system and a mobile power source or supply, such as one or more batteries, for example.

As described above, examples of a mobile computing device may include an a CR or AR HMD, as well as a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 20, device 2000 may include a housing with a front 2001 and a back 2002. Device 2000 includes a display 2004, an input/output (I/O) device 2006, and an integrated antenna 2008. Device 2000 also may include navigation features 2012. I/O device 2006 may include any suitable I/O device for entering information into a mobile computing device. Examples for I/O device 2006 may include an alphanumeric keyboard, a numeric keypad, a touch pad, input keys, buttons, switches, microphones, speakers, voice recognition device and software, and so forth. Information also may be entered into device 2000 by way of microphone 2014, or may be digitized by a voice recognition device. As shown, device 2000 may include a camera 2005 (e.g., including at least one lens, aperture, and imaging sensor) and a flash 2010 integrated into back 2002 (or elsewhere) of device 2000. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of image processing, comprises generating root elemental images being less than all elemental images on an integral image having content of a scene, wherein each elemental image is of a different light projecting element on an array of the elements forming a near-eye display; using the root elemental images to generate other elemental images of the integral image; and providing the root and other elemental images to display the integral image on the near-eye display.

By one or more second implementations, and further to the first implementation, wherein the root elemental images are reprojected to form one or more other elemental images of the integral image.

By one or more third implementations, and further to the first or second implementation, wherein the root elemental images are spaced from each other in a predetermined pattern.

By one or more fourth implementations, and further to any of the first to third implementation, wherein the root elemental images are spaced from each other in fixed intervals along rows and columns of elemental image locations of the integral image.

By one or more fifth implementations, and further to any of the first to fourth implementation, wherein the root elemental images are positioned along outer boundaries of superblocks each having multiple elemental image locations.

By one or more sixth implementations, and further to the fifth implementation, wherein the root elemental images are positioned at or adjacent corners of the superblocks.

By one or more seventh implementations, and further to the fifth or sixth implementation, wherein one root elemental image is placed only at the upper-most left corner elemental image in multiple superblocks.

By one or more eighth implementations, and further to any one of the fifth to seventh implementation, wherein the superblocks are 3×3 to 6×6 elemental image locations.

By one or more ninth implementations, and further to any one of the fifth to eighth implementation, wherein the root elemental images are placed along less than all sides of the boundaries of a superblock.

By one or more tenth implementations, and further to any of the fifth to ninth implementation, wherein at least one root elemental image is placed interiorly of the boundaries of the superblocks.

By one or more eleventh implementations, and further to any of the first to tenth implementation, wherein the individual elemental images vary in perspective of the scene, and wherein an individual root elemental image is reprojected to the perspective of the other elemental image to generate the other elemental image.

By an example twelfth implementation, a computer-implemented image processing system, comprises memory; one or more near-eye displays each having an array of light projecting elements each arranged to form an elemental image of an integral image having content of a scene; and processor circuitry forming at least one processor communicatively coupled to the memory and near-eye display, the at least one processor being arranged to operate by: generating root elemental images being less than all elemental images on the integral image, using the root elemental images to generate other elemental images of the integral image, and providing the root and other elemental images to display the integral image on the near-eye display.

By one or more thirteenth implementations, and further to the twelfth implementation, wherein the positions of the root elemental images change over time and from integral image to integral image in a video sequence of integral images. This may or may not comprise having the position of the root elemental images at least partly depend on one or more velocity buffers that track motion of pixel data or blocks of pixels from one frame to another frame.

By one or more fourteenth implementations, wherein the positions of the root elemental images vary on the integral image depending on the complexity of the integral image content or variation in depth of the integral image content.

By one or more fifteenth implementations, and further to any of the twelfth to fourteenth implementation, wherein individual other elemental images are formed by using the root elemental image closest to the location of the other elemental image.

By one or more sixteenth implementations, and further to any one of the twelfth to fifteenth implementation, wherein individual other elemental images are each formed by using a single root elemental image.

By one or more seventeenth implementations, and further to any one of the twelfth to fifteenth implementation, wherein individual other elemental images are each formed by combining the resulting elemental images from reprojecting multiple root elemental images.

By one or more example eighteenth implementations, at least one non-transitory computer readable medium comprises a plurality of instructions that in response to being executed on a computing device, causes the computing device to operate by: generating root elemental images being less than all elemental images on an integral image having content of a scene, wherein each root elemental image is of a different light projecting element on an array of the elements forming a near-eye display; using the root elemental images to generate other elemental images of the integral image; and providing the root and other elemental images to display the integral image on the near-eye display.

By one or more nineteenth implementations, and further to the eighteenth implementation, wherein the instructions cause the computing device to operate by projecting a pixel location of at least one root elemental image to find a corresponding pixel location on an other elemental image comprising using projection matrices of individual elemental image positions associated with the integral image.

By one or more twentieth implementations, and further to either the eighteenth or nineteenth implementation, wherein the instructions cause the computing device to operate by performing a projection of image data from a root elemental image to an other root elemental image comprising generating pixel location projections of multiple jitter iterations each with a different shift of image data, and combining the pixel location projections into a single projection.

By one or more twenty-first implementations, and further to any one of the eighteenth to twentieth implementation, wherein the instructions cause the computing device to operate by projecting a pixel location from an other elemental image to determine a corresponding pixel location in a root elemental image.

By one or more twenty-second implementations, and further to any one of the eighteenth to twenty-first implementation, wherein the instructions cause the computing device to operate by dropping image data of a pixel on an other elemental image and copied from a root elemental image pixel when a pixel depth value of the image data does not meet at least one depth criterion established by using the content of the integral image.

By one or more twenty-third implementations, and further to any one of the eighteenth to twenty-second implementation, wherein the instructions cause the computing device to operate by changing a pixel depth value of an other elemental image when at least one previously filled pixel of the other elemental image has a different depth value.

By one or more twenty-fourth implementations, and further to any one of the eighteenth to twenty-third implementation, wherein the instructions cause the computing device to operate by repeating the use of one or more root elemental images to generate one or more pixel locations at holes or distortions of an other elemental image previously generated by using the root elemental image.

By one or more twenty-fifth implementations, and further to any one of the eighteenth to twenty-fourth implementation, wherein the instructions cause the computing device to operate by applying a neural network to at least fill holes of missing image data of at least portions of the integral image before displaying the integral image.

In a further example, at least one machine readable medium may include a plurality of instructions that in response to being executed on a computing device, causes the computing device to perform the method according to any one of the above examples.

In yet a further example, at least one machine readable medium includes a plurality of instructions that in response to being executed on a computing device, cause the computing device to perform a method according to any one of the above implementations.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method comprising:
generating root elemental images corresponding to an integral image including a plurality of elemental images corresponding to a scene, ones of the plurality of elemental images associated respectively with different light projecting elements of an array of light projecting elements, the array of light projecting elements to form a near-eye display;
generating, based on the root elemental images, other elemental images of the integral image, the generating of a first one of the other elemental images including:
generating first image data of a pixel of the first one of the other elemental images based on second image data from a pixel of a first one of the root elemental images; and
dropping the first image data of the pixel based on a pixel depth value of the first image data not meeting at least one depth criterion, the at least one depth criterion based on content of the integral image; and
providing the root elemental images and the other elemental images to cause the integral image to be displayed on the near-eye display.

2. The method of claim 1, including reprojecting the root elemental images to form one or more of the other elemental images of the integral image.

3. The method of claim 1, wherein the root elemental images are spaced from one other based on a predetermined pattern.

4. The method of claim 1, wherein the root elemental images are spaced from one other by fixed intervals along rows and columns of elemental image locations of the integral image.

5. The method of claim 1, wherein the root elemental images are along outer boundaries of superblocks, a superblock associated with multiple elemental image locations.

6. The method of claim 5, wherein the root elemental images are at adjacent corners of the superblocks.

7. The method of claim 5, wherein the root elemental images are at upper-most left corner elemental image locations of respective ones of the superblocks.

8. The method of claim 5, wherein the superblocks include 3×3 to 6×6 elemental image locations.

9. The method of claim 5, wherein the root elemental images are along fewer than all boundaries of ones of the superblocks.

10. The method of claim 5, wherein at least one root elemental image is within the outer boundaries of the superblocks.

11. The method of claim 1, wherein ones of the plurality of elemental images vary in perspective of the scene, and including reprojecting the first one of the root elemental images based on a perspective of the first one of the other elemental images to generate the first one of the other elemental images.

12. A system comprising:
memory;
at least one near-eye display having an array of light projecting elements, respective ones of the light projecting elements to form corresponding ones of a plurality of elemental images of an integral image corresponding to a scene;
instructions; and
at least one programmable circuit to be programmed based on the instructions to:
generate root elemental images of the plurality of elemental images of the integral image;
generate, based on the root elemental images, other elemental images of the integral image, generation of a first one of the elemental images including:
generation of multiple pixel location projections of a pixel location of a first one of the root elemental images to a corresponding pixel location of the first one of the elemental images, the multiple pixel location projections based on respective different jitter shifts of image data of the first one of the root elemental images; and
combination of the multiple pixel location projections into a single projection for the corresponding pixel location of the first one of the elemental images; and
provide the root elemental images and other elemental images to cause the integral image to be displayed on the at least one near-eye display.

13. The system of claim 12, wherein the integral image is a first integral image, and one or more of the at least one programmable circuit is to change positions of the root elemental images of a second integral image relative to the first integral image, the first integral image and the second integral image included in a video sequence of integral images.

14. The system of claim 12, wherein one or more of the at least one programmable circuit is to vary positions of the root elemental images of the integral image based on at least one of a complexity of the integral image or a variation in depth of the integral image.

15. The system of claim 12, wherein one or more of the at least one programmable circuit is to generate the first one of the other elemental images based on the first one of the root elemental images being closest to a location of the first one of the other elemental images.

16. The system of claim 12, wherein one or more of the at least one programmable circuitry is to generate a plurality of the other elemental images based on a single root elemental image of the root elemental images.

17. The system of claim 12, wherein one or more of the at least one programmable circuitry is to reproject a plurality of the root elemental images to generate the first one of the other elemental images.

18. At least one non-transitory computer readable medium comprising a plurality of instructions to cause at least one programmable circuit to at least:
generate root elemental images corresponding to an integral image including a plurality of elemental images corresponding to a scene, ones of the root elemental images associated respectively with different light projecting elements of an array of light projecting elements, the array of light projecting elements to form a near-eye display;
generate, based on the root elemental images, other elemental images of the integral image, generation of a first one of the elemental images including:
generation of multiple pixel location projections of a pixel location of a first one of the root elemental images to a corresponding pixel location of the first one of the elemental images, the multiple pixel location projections based on respective different jitter shifts of image data of the first one of the root elemental images; and
combination of the multiple pixel location projections into a single projection for the corresponding pixel location of the first one of the elemental images; and provide the root elemental images and the other elemental images to cause the integral image to be displayed on the near-eye display.

19. The at least one non-transitory computer readable medium of claim 18, wherein the instructions are to cause one or more of the at least one programmable circuit to project the pixel location of the first one of the root elemental images to find the corresponding pixel location of the first one of the other elemental images, the projection based on projection matrices of individual elemental image positions associated with the integral image.

20. The at least one non-transitory computer readable medium of claim 18, wherein the instructions are to cause one or more of the at least one programmable circuit to project a first pixel location of the first one of the other elemental images to determine a corresponding first pixel location of the first one of the root elemental images.

21. The at least one non-transitory computer readable medium of claim 18, wherein the instructions are to cause one or more of the at least one programmable circuit to change a pixel depth value of the first one of the other elemental images based on at least one previously filled pixel of the first one of the other elemental images having a different depth value.

22. The at least one non-transitory computer readable medium of claim 18, wherein the instructions are to cause one or more of the at least one programmable circuit to perform a re-sampling operation to generate one or more pixel locations at holes or distortions of the first one of the other elemental images.

23. The at least one non-transitory computer readable medium of claim 18, wherein the instructions are to cause one or more of the at least one programmable circuit to apply a neural network to at least fill holes of missing image data of at least portions of the integral image before the integral image is displayed.

* * * * *